(12) United States Patent
     Taylor

(10) Patent No.: US 12,510,664 B2
(45) Date of Patent: Dec. 30, 2025

(54) DEVICE AND METHOD FOR SHOAL DETECTION

(71) Applicant: Furuno Electric Co., Ltd., Nishinomiya (JP)

(72) Inventor: Matthew Clive Taylor, Auckland (NZ)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 272 days.

(21) Appl. No.: 18/241,253

(22) Filed: Sep. 1, 2023

(65) Prior Publication Data

US 2024/0103162 A1    Mar. 28, 2024

(30) Foreign Application Priority Data

Sep. 27, 2022 (EP) .................................. 22197949

(51) Int. Cl.
     *G01S 15/93*    (2020.01)
     *G01S 7/56*     (2006.01)
(52) U.S. Cl.
     CPC ............... *G01S 15/93* (2013.01); *G01S 7/56* (2013.01)
(58) Field of Classification Search
     None
     See application file for complete search history.

(56) References Cited

U.S. PATENT DOCUMENTS

| | | | | |
|---|---|---|---|---|
| 6,096,085 | A | * | 8/2000 | Sammelman ....... G01S 7/52004 703/2 |
| 2005/0099887 | A1 | * | 5/2005 | Zimmerman ........... G01S 7/527 367/12 |
| 2005/0286345 | A1 | * | 12/2005 | Arvelo ................. G01S 7/52004 367/131 |
| 2021/0286061 | A1 | * | 9/2021 | Charlot ................. G01S 7/6245 |

OTHER PUBLICATIONS

"FLS 3D—3D Forward Looking Sonar", EchoPilot, Available Online at: https://echopilot.com/products/3d-forward-looking-sonar/, Retrieved from Online on Aug. 18, 2023, 5 pages.
European Search Opinion for EP Application 22197949.5, filed on Sep. 27, 2022, 4 pages.

* cited by examiner

*Primary Examiner* — Luke D Ratcliffe
*Assistant Examiner* — Vikas Atmakuri
(74) *Attorney, Agent, or Firm* — XSENSUS LLP

(57) ABSTRACT

A sonar device including a transmitter, a transducer, and processing circuitry is provided. The transmitter is configured to transmit a transmission signal. The transducer is configured to project ultrasonic waves in a water body, the ultrasonic waves being generated based on the transmission signal; receive reflected ultrasonic waves from one or more objects in the water body; and generate a reception signal based on the reflected ultrasonic waves. The processing circuitry is configured to generate a plurality of reception beams based on the reception signal; detect a seafloor among the one or more objects based on the plurality of reception beams; determine a limit incidence angle at which the (Continued)

seafloor is detected; extrapolate a shoal line based on the limit incidence angle, the extrapolated shoal line connecting with the detected seafloor; and detect a potential shoal hazard based on a determined depth of the extrapolated shoal line.

18 Claims, 24 Drawing Sheets

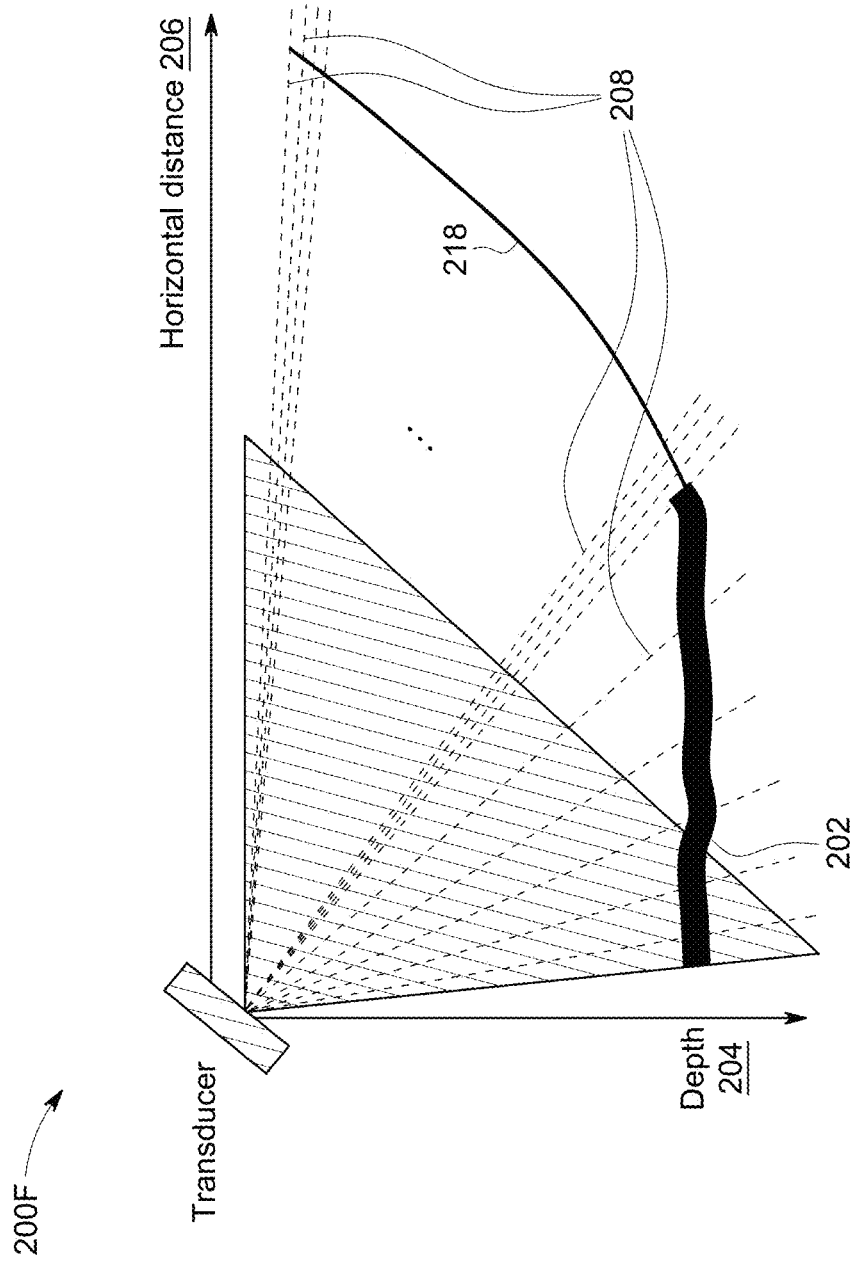

| Maximum Detection Incidence | 83 | For extrapolation of shoaling | | | | | |
|---|---|---|---|---|---|---|---|
| Current Beam Detection | 83 | Angle of detection remaining with seafloor (90-x) = tracking angle achieved | | | | | |
| Increment | 1 | Faction of depth | | | | Depth | |
| Distance(m) 302 | Distance (x depth) 304 | Angle of Incidence (degrees) 306 | Angle of undetecable shoal (degrees) 308 | Shoaling (% depth) 310 | Accumulated Shoaling (% depth) 312 | Shoal Depth % 314 | Shoal Depth (m) 316 |
| 5 | 1 | 45.00 | 0.00 | 0.0% | 0.0% | 100.0% | 5 |
| 10 | 2 | 63.43 | 0.00 | 0.0% | 0.0% | 100.0% | 5 |
| 15 | 3 | 71.57 | 0.00 | 0.0% | 0.0% | 100.0% | 5 |
| 20 | 4 | 75.96 | 0.00 | 0.0% | 0.0% | 100.0% | 5 |
| 25 | 5 | 78.69 | 0.00 | 0.0% | 0.0% | 100.0% | 5 |
| 30 | 6 | 80.54 | 0.00 | 0.0% | 0.0% | 100.0% | 5 |
| 35 | 7 | 81.87 | 0.00 | 0.0% | 0.0% | 100.0% | 5 |
| 40 | 8 | 82.87 | 0.00 | 0.0% | 0.0% | 100.0% | 5 |
| 45 | 9 | 83.66 | 0.66 | 1.2% | 1.2% | 98.8% | 4.942418 |
| 50 | 10 | 84.29 | 1.29 | 2.3% | 3.4% | 96.6% | 4.829877 |
| 55 | 11 | 84.81 | 1.81 | 3.2% | 6.6% | 93.4% | 4.672259 |
| 60 | 12 | 85.24 | 2.24 | 3.9% | 10.5% | 89.5% | 4.477001 |
| 65 | 13 | 85.60 | 2.60 | 4.5% | 15.0% | 85.0% | 4.249839 |
| 70 | 14 | 85.91 | 2.91 | 5.1% | 20.1% | 79.9% | 3.995292 |
| 75 | 15 | 86.19 | 3.19 | 5.6% | 25.7% | 74.3% | 3.71698 |
| 80 | 16 | 86.42 | 3.42 | 6.0% | 31.6% | 68.4% | 3.417853 |
| 85 | 17 | 86.63 | 3.63 | 6.4% | 38.0% | 62.0% | 3.100341 |
| 90 | 18 | 86.82 | 3.82 | 6.7% | 44.7% | 55.3% | 2.766474 |
| 95 | 19 | 86.99 | 3.99 | 7.0% | 51.6% | 48.4% | 2.417961 |
| 100 | 20 | 87.14 | 4.14 | 7.2% | 58.9% | 41.1% | 2.056259 |
| 105 | 21 | 87.27 | 4.27 | 7.5% | 66.3% | 33.7% | 1.682616 |
| 110 | 22 | 87.40 | 4.40 | 7.7% | 74.0% | 26.0% | 1.298112 |
| 115 | 23 | 87.51 | 4.51 | 7.9% | 81.9% | 18.1% | 0.903686 |
| 120 | 24 | 87.61 | 4.61 | 8.1% | 90.0% | 10.0% | 0.500161 |
| 125 | 25 | 87.71 | 4.71 | 8.2% | 98.2% | 1.8% | 0.088261 |
| 130 | 26 | 87.80 | 4.80 | 8.4% | 106.6% | -6.6% | -0.33137 |

FIG. 3A

| Maximum Detection Incidence | 80 | For extrapolation of shoaling | | | | | | |
|---|---|---|---|---|---|---|---|---|
| Current Beam Detection | 83 | Angle of detection remaining with seafloor (90-x) = tracking angle achieved | | | | | | |
| Increment | Distance (x depth) 304 | Faction of depth | | | | | Depth | |
| | | Angle of Incidence (degrees) 306 | Angle of undetecable shoal (degrees) 308 | Shoaling (% depth) 310 | Accumulated Shoaling (% depth) 312 | Shoal Depth % 314 | Shoal Depth (m) 316 | |
| Distance(m) 302 | | | | | | | | 10 |
| 10 | 1 | 45.00 | 0.00 | 0.0% | 0.0% | 100.0% | 10 | |
| 20 | 2 | 63.43 | 0.00 | 0.0% | 0.0% | 100.0% | 10 | |
| 30 | 3 | 71.57 | 0.00 | 0.0% | 0.0% | 100.0% | 10 | |
| 40 | 4 | 75.96 | 0.00 | 0.0% | 0.0% | 100.0% | 10 | |
| 50 | 5 | 78.69 | 0.00 | 0.0% | 0.0% | 100.0% | 10 | |
| 60 | 6 | 80.54 | 0.00 | 0.0% | 0.0% | 100.0% | 10 | |
| 70 | 7 | 81.87 | 0.00 | 0.0% | 0.0% | 100.0% | 10 | |
| 80 | 8 | 82.87 | 0.00 | 0.0% | 0.0% | 100.0% | 10 | |
| 90 | 9 | 83.66 | 3.66 | 6.4% | 6.4% | 93.6% | 9.360373 | |
| 100 | 10 | 84.29 | 4.29 | 7.5% | 13.9% | 86.1% | 8.610328 | |
| 110 | 11 | 84.81 | 4.81 | 8.4% | 22.3% | 77.7% | 7.769626 | |
| 120 | 12 | 85.24 | 5.24 | 9.2% | 31.5% | 68.5% | 6.853156 | |
| 130 | 13 | 85.60 | 5.60 | 9.8% | 41.3% | 58.7% | 5.872419 | |
| 140 | 14 | 85.91 | 5.91 | 10.4% | 51.6% | 48.4% | 4.836482 | |
| 150 | 15 | 86.19 | 6.19 | 10.8% | 62.5% | 37.5% | 3.75262 | |
| 160 | 16 | 86.42 | 6.42 | 11.3% | 73.7% | 26.3% | 2.626758 | |
| 170 | 17 | 86.63 | 6.63 | 11.6% | 85.4% | 14.6% | 1.463786 | |
| 180 | 18 | 86.82 | 6.82 | 12.0% | 97.3% | 2.7% | 0.267788 | |
| 190 | 19 | 86.99 | 6.99 | 12.3% | 109.6% | -9.6% | -0.95779 | |

FIG. 3B

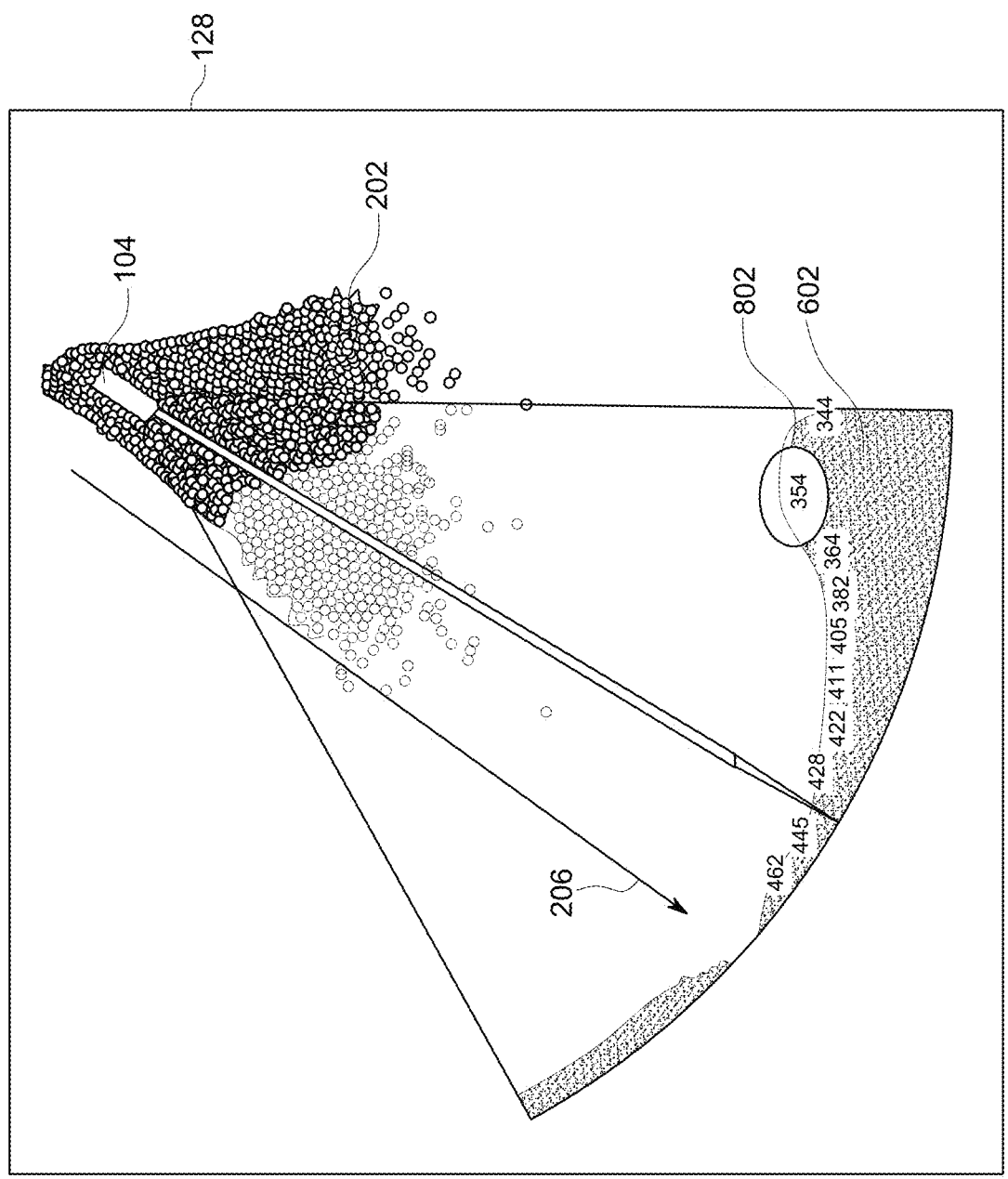

DEVICE AND METHOD FOR SHOAL DETECTION

CROSS-REFERENCE TO RELATED APPLICATION(S)

This application claims priority under 35 U.S.C. § 119 to European Patent Application No. EP22197949 filed Sep. 27, 2022, which is hereby incorporated by reference in its entirety.

TECHNICAL FIELD

The present invention mainly relates to a sonar device and a method for detection of objects under water, and more specifically to a sonar device and method for possible hazard detection under water.

BACKGROUND

Over the years, sonar devices have been used to determine depth of seafloors. Conventionally, sonar devices are used to generate a map of seafloor around a vessel. However, sound does not reflect strongly from objects at high angles of incidence (beyond 80 degrees) which are within an area of interest in shallow water. As a result, seafloor can only be detected up to a range ahead of the vessel. Due to this limitation, in shallow water, a gentle shoaling ahead of the vessel is invisible and a reflected signal may only occur when striking a wall or the shoreline. The invisibility of the gentle shoal is of particular concern when relying on the sonar device to determine clear passage ahead of the vessel.

In some situations, the sonar device may work up to several hundred meters distance but may be unable to determine reduction in the depth of water, such as due to shoaling. In such kind of situation, the vessel may not be able to achieve a safe passage underwater. This gives a vessel operator a false sense of security.

It has been observed that at ranges beyond approximately 8 times the depth of the seafloor, the return of a sonar beam from the seafloor is generally undetectable with the sonar device. Patent document 1 and Patent document 2 discloses such a device.

As used herein, the patent document 1 may be U.S. Pat. No. 6,096,085 and the patent document 2 may be US2005/0286345A1.

Patent document 1 discloses about sonar modeling and interaction with known simulated bathymetry/sediments/targets.

Patent document 2 discloses about sonar interaction with known measured bathymetry. The patent document 2 discusses ways to model sonar interaction with a specific environment/seafloor. The method disclosed in patent document 2 discloses shoal concept in terms of modeling expected system performance/SNR of the sonar device.

In view of the above problems, it is an object of the present invention to provide a sonar device for detection of a shoal, a shoal detection method and a program for making a computer execute a function for shoal detection with improved detection range of hazards at which clear navigation may be assured.

The present invention uses modeling of sonar interaction to infer a worst-case scenario during underwater detection of a shoal, even though it is within the beam of the sonar device and no return is present. This inference of data that cannot be seen within the beam is completely lacking from the patent document 1 and the patent document 2 referred above.

SUMMARY

A first aspect of the invention relates to a sonar device. The sonar device includes a transmitter, a transducer, and processing circuitry. The transmitter is configured to transmit a transmission signal. The transducer is configured to project ultrasonic waves in a water body. The ultrasonic waves are generated based on the transmission signal. The transducer is configured to receive reflected ultrasonic waves from one or more objects in the water body and to generate a reception signal based on the reflected ultrasonic waves. Further, the processing circuitry is configured to generate a plurality of reception beams based on the reception signal. The processing circuitry is configured to detect a seafloor among the one or more objects based on the plurality of reception beams. The processing circuitry is configured to determine a limit incidence angle at which the seafloor is detected. The processing circuitry is configured to extrapolate a shoal line based on the limit incidence angle. The extrapolated shoal line connects with the detected seafloor. In addition, the processing circuitry is configured to detect a potential shoal hazard based on a determined depth of the extrapolated shoal line.

Even though the sonar device can only detect the seafloor up to a distance from the sonar device, according to this configuration, the sonar device can infer a potential shoal hazard beyond the detection range of the sonar device.

In an embodiment of the sonar device, the processing circuitry may be configured to determine the depth associated with the extrapolated shoal line, the depth associated with the extrapolated shoal line being a distance between a point on the shoal line and a surface of the water body. The processing circuitry may also be configured to detect the potential shoal hazard based on a determination that the determined depth associated with the extrapolated shoal line is less than a threshold depth and to calculate a horizontal distance from the transducer to the detected potential shoal hazard. The sonar device may include a display that is configured to display the detected potential shoal hazard at the calculated horizontal distance and to display the detected seafloor. The display may also be configured to display the calculated horizontal distance or display a time of expected collision of a vessel on which the sonar device is installed, with the potential shoal hazard, the time of expected collision being calculated based on the calculated horizontal distance and a speed of the vessel.

According to this configuration, the display displays information derived from the sonar device to expand on the information available for an operator, such as display of the potential shoal hazard, the distance to the potential shoal hazard or the time of expected collision with the potential shoal hazard.

A second aspect of the invention relates to a shoal detection method. The shoal detection method includes transmitting a transmission signal from a transmitter to a transducer. The shoal detection method includes projecting ultrasonic waves in a water body based on the transmission signal and receiving reflected ultrasonic waves from one or more objects in the water body. The shoal detection method includes generating a reception signal based on the reflected ultrasonic waves, and generating a plurality of reception beams based on the reception signal. The shoal detection method includes detecting a seafloor among the one or more objects based on the plurality of reception beams. The shoal detection method includes determining a limit incidence angle at which seafloor is detected. The shoal detection method includes extrapolating a shoal line based on the limit incidence angle, the extrapolated shoal line connecting with the detected seafloor. The shoal detection method includes detecting a potential shoal hazard based on a determined depth of the extrapolated shoal line.

According to the shoal detection method, the same effect as that of the sonar device according to the first aspect of the invention can be obtained.

A third aspect of the invention relates to a non-transitory computer-readable medium having stored thereon computer-executable instructions which, when executed by a computer, cause the computer to transmit a transmission signal from a transmitter to a transducer; project ultrasonic waves in a water body based on the transmission signal and receive reflected ultrasonic waves from one or more objects in the water body; generate a reception signal based on the reflected ultrasonic waves; generate a plurality of reception beams based on the reception signal; detect a seafloor among the one or more objects based on the plurality of reception beams; determine a limit incidence angle at which the seafloor is detected; extrapolate a shoal line based on the limit incidence angle, the extrapolated shoal line connecting with the detected seafloor; and detect a potential shoal hazard based on a determined depth of the extrapolated shoal line.

According to the program according to this embodiment, the same effect as that of the sonar device according to the first aspect of the invention can be obtained.

As described above, according to the present invention, it is possible to provide a sonar device, a shoal detection method, and a program capable of accurately detecting the shoal.

The effect or significance of the present invention will be further clarified by the description of the following embodiments. However, the embodiments shown below are only examplary embodiments of the present invention, and the present invention is not limited to the embodiments described below.

The foregoing summary is illustrative only and is not intended to be in any way limiting. In addition to the illustrative aspects, embodiments, and features described above, further aspects, embodiments, and features will become apparent by reference to the drawings and the following detailed description.

In various embodiments, a device and a method may be provided for detecting objects under water at a seafloor. Example embodiments of the present invention provide a sonar device that accurately detects objects under water and provide safe passage. Additionally, the sonar device is configured to give an extended range of hazard detection and assist with informing an operator about the current usable hazard detection range, and thus indicate a safe vessel speed on that heading. This tends to give an early warning of collision well before it is needed.

BRIEF DESCRIPTION OF THE DRAWINGS

The present invention is illustrated by way of example and not by way of limitation in the figures of the accompanying drawings, in which the like reference numerals indicate like elements and in which:

FIG. 2F is a diagram that illustrates the extrapolated shoal line, in accordance with an example embodiment;

FIG. 3A is a first tabular representation of simulation results for extrapolation of the shoal line, in accordance with an example embodiment;

FIG. 3B is a second tabular representation of the simulation results for extrapolation of the shoal line, in accordance with an example embodiment;

FIG. 8 is a diagram depicting display of an examplary shoaling data associated with the potential shoal hazard on a display of a sonar device, in accordance with an example embodiment;

DETAILED DESCRIPTION

Figure 1A:
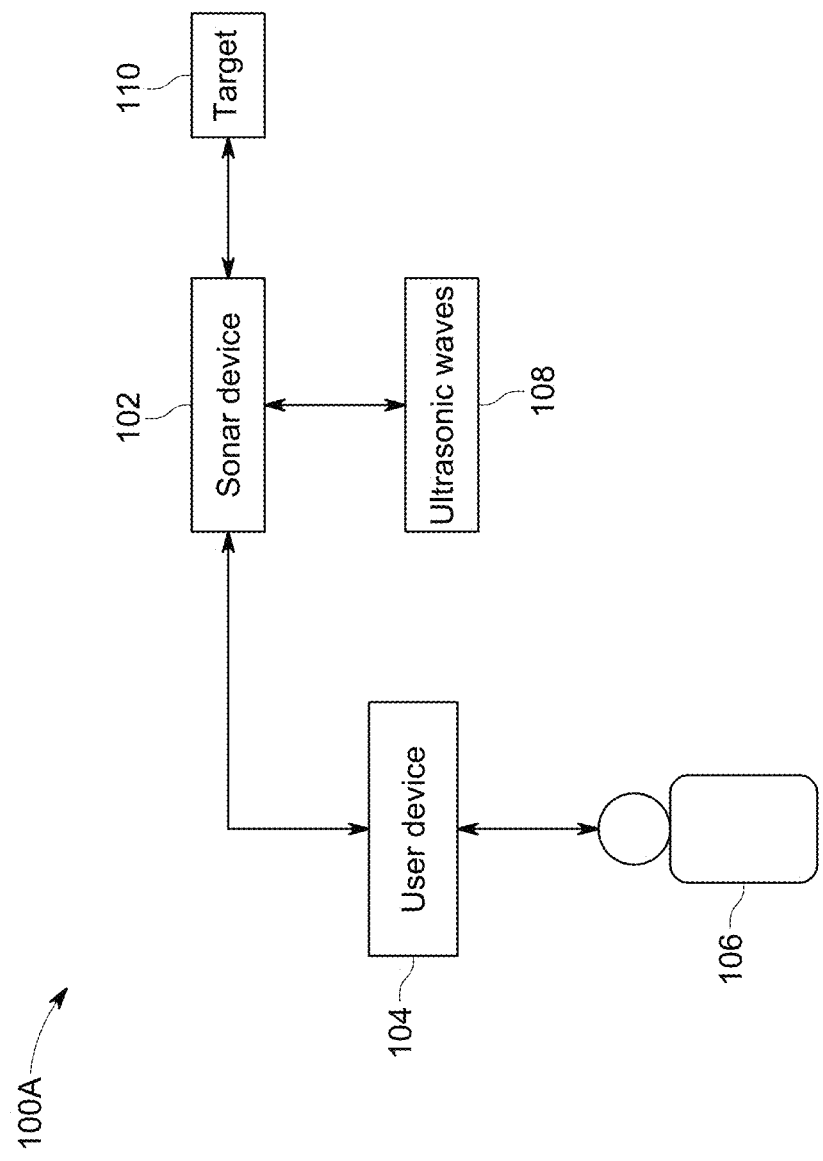
FIG. 1A is a schematic diagram that exemplarily illustrates a working environment of a sonar device, in accordance with an example embodiment.

In the following description, for purposes of explanation, numerous specific details are set forth in order to provide a thorough understanding of the present invention. It will be apparent, however, to one skilled in the art that the present invention may be practiced without these specific details. In other instances, systems and methods are shown in block diagram form only in order to avoid obscuring the present invention.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this invention will satisfy applicable legal requirements. Like reference numerals refer to like elements throughout.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present invention.

One of the objectives of the present invention is to provide an efficient sonar device for detection of objects under water. It is also an objective of the present invention to determine minimum safe clearance by extrapolating a shoal line. It is also an objective of the present invention to give extended range of hazard detection and assist with informing an operator about the current usable hazard detection range. In accordance with various embodiments, the present invention proposes a safe vessel speed. In addition, the present invention provides early warnings of collision by notifying the user about hazard detection.

FIG. 1A is a schematic diagram that exemplarily illustrates a working environment 100A of a sonar device 102, in accordance with an example embodiment. The working environment 100A includes the sonar device 102, a user device 104 (which may also be referred to as a vessel), an operator 106, ultrasonic waves 108, and a target 110. In an example embodiment, the sonar device 102 is installed in the user device 104. The user device 104 may be a vessel navigating over a water body. The water body may comprise a sea, an ocean, a river, or the like. In an example embodiment, the sonar device 102 is deployed to detect and identify the target 110, such as submarines and mines. In another embodiment, the sonar device 102 is deployed to detect a potential shoal hazard ahead of the user device 104. In an embodiment, the sonar device 102 may be used during offshore monitoring without the presence of the user device 104. In an example, the user device 104 may correspond to a ship, a boat, or the like. In general, the sonar device 102 is configured to detect and determine the distance and direction of underwater objects with respect to the sonar device 102 by use of acoustic means. For example, sound waves emitted by the sonar device 102 and reflected sound waves from the object are detected and analyzed by the sonar device 102. In an exemplary embodiment, the sound waves may be the ultrasonic waves 108.

The sonar device 102 is configured to project the ultrasonic waves 108 in the water body. The sonar device 102 receives reflected ultrasonic waves 108 from one or more objects (e.g., the target 110) in the water body and generates a reception signal based on the reflected ultrasonic waves 108. In general, the ultrasonic waves 108 correspond to inaudible sound waves with a high frequency (generally exceeding 20 kHz). In an embodiment, the sonar device 102 transmits the ultrasonic waves 108 and further generates the reception signal by detecting the ultrasonic waves 108 after they reflect from the one or more objects in the water body. In addition, a plurality of reception beams is generated based on the reception signal for seafloor detection. A detailed analysis of the sonar device 102 is described below with respect to FIG. 1B.

Figure 1B:
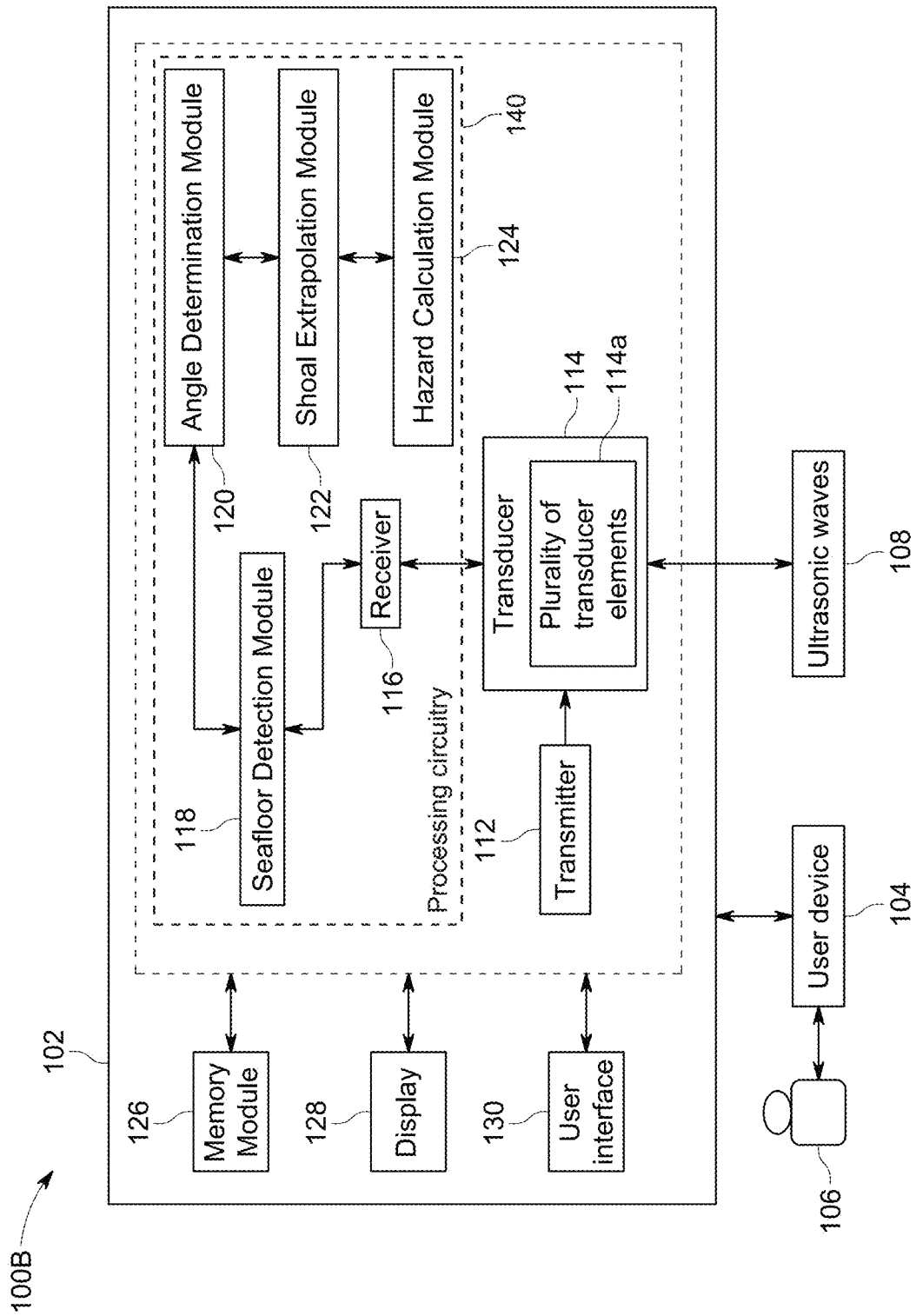
FIG. 1B is a block diagram of the sonar device, exemplarily illustrated in FIG. 1A, in accordance with an example embodiment.

FIG. 1B is a block diagram 100B of the sonar device 102, exemplarily illustrated in FIG. 1A, in accordance with an example embodiment. The sonar device 102 includes a transmitter 112, a transducer 114, and processing circuitry 140. Further, the sonar device 102 includes a memory module 126 (also referred to as hereinafter as memory), a display 128 and a user interface 130. The processing circuitry 140 includes a receiver 116, a seafloor detection module 118, an angle determination module 120, a shoal extrapolation module 122, and a hazard calculation module 124.

The transmitter 112 may be configured to transmit a transmission signal to the transducer 114. For example, the transmission signal is an electrical signal. The transducer 114 receives the transmission signal. The transducer 114 may include a plurality of transducer elements 114a. The transmitter 112 transmits the transmission signal to each transducer element of the plurality of transducer elements 114a. The plurality of transducer elements 114a corresponds to ultrasonic transducer elements such as an array of piezoelectric crystals. The transducer 114 transforms the transmission signal into the ultrasonic waves 108. The transducer 114 is configured to project the ultrasonic waves 108 in a wide transmission beam in the water body, such as a sea. The ultrasonic waves 108 may be projected towards a seafloor of the water body or the sea. The ultrasonic waves 108 travel through the water body and get reflected back after striking the one or more objects, such as the seafloor that may be in the water body. Each of the plurality of transducer elements 114a of the transducer 114 is configured to receive the ultrasonic waves 108 reflected from the one or more objects in the water body. Further, each transducer element 114a of the transducer 114 is configured to generate a reception signal based on the reflected ultrasonic waves 108 and the transducer 114 provides the reception signals to the receiver 116.

The receiver 116 is configured to receive the reception signals from the transducer 114. In addition, the receiver 116 is configured to generate a plurality of reception beams based on the reception signals. The receiver 116 performs beamforming on the received reception signals to generate the plurality of reception beams. Further, the receiver 116 is configured to form the plurality of reception beams in a plurality of directions in the water body. The reception beams are utilized to detect the one or more objects, such as the seafloor in the water body in multiple directions. Further, a width of each reception beam of the plurality of reception beams is thin or narrow as compared to a width of the transmission beam. The width of the plurality of reception beams depends on a number of the plurality of transducer elements 114a within the transducer 114. In an example, an angle between two reception beams is set to 1 degree. In another example, the angle between two reception beams may be set to any value, for example, 2 degrees. Further, the plurality of reception beams is utilized to detect the seafloor with facilitation of the seafloor detection module 118. The seafloor detection module 118 is configured to detect the seafloor based on the plurality of reception beams. Details of the detection of the seafloor are further provided, for example, in FIG. 2A.

Based on the detection of the seafloor, the angle determination module 120 is configured to calculate a limit incidence angle at which the seafloor is detected. In an embodiment, the limit incidence angle corresponds to an angle between a first reception beam of the plurality of reception beams at which the seafloor is detectable and a normal to the surface of the seafloor (i.e., a normal to a tangent of the surface of the seafloor). For example, the first reception beam may be a last reception beam at which the seafloor may be detectable. Thus, at a subsequent reception beam of the first reception beam, the seafloor may be undetectable. Therefore, the limit incidence angle in a manner corresponds to an incidence angle beyond which the seafloor is not detectable. In an embodiment, the user interface 130 may be utilized by the operator 106 to select or adjust the limit incidence angle. Details of the determination of the limit incidence angle are further provided, for example, in FIG. 2B.

Based on the determination of the limit incidence angle, the shoal extrapolation module 122 is configured to extrapolate a shoal line. The extrapolated shoal line connects to the detected seafloor. The shoal line may correspond to a start of the potential shoal in the water body. Further, the hazard calculation module 124 is configured to detect the potential shoal hazard based on a determined depth of the extrapolated shoal line. Details of the extrapolation of the shoal line are further provided, for example, in FIG. 2E.

Moreover, the hazard calculation module 124 is further configured to calculate a horizontal distance between the transducer 114 and the potential shoal hazard to avoid collision of the user device 104 with the potential shoal hazard. The horizontal distance is the distance ahead of the user device 104 towards the potential shoal hazard. The horizontal distance from the transducer 114 to the potential shoal hazard is calculated when the determined depth of the extrapolated shoal line is less than a given threshold. Further, the potential shoal hazard at the calculated horizontal distance is displayed to the operator 106 using the display 128. The display 128 is configured to display the potential shoal hazard at the calculated horizontal distance and also to display the detected seafloor. Furthermore, in some embodiments, the hazard calculation module 124 is configured to calculate a time of expected collision of the user device 104 with the potential shoal hazard, based on a speed of the user device 104 and the calculated horizontal distance. The calculated horizontal distance and the time of expected collision of the user device 104 may be stored in the memory module 126.

The sonar device 102 receives the reflected ultrasonic waves 108 (or the echoes) from the seafloor and the one or more objects such as fish, underwater structures, and the like. In order to distinguish the echoes of the seafloor from the echoes of the one or more objects, the sonar device 102 performs echo discrimination using one or more algorithms that distinguish the echoes of the seafloor based on echo signal level and continuity of the echoes along long distances.

Figure 2A:
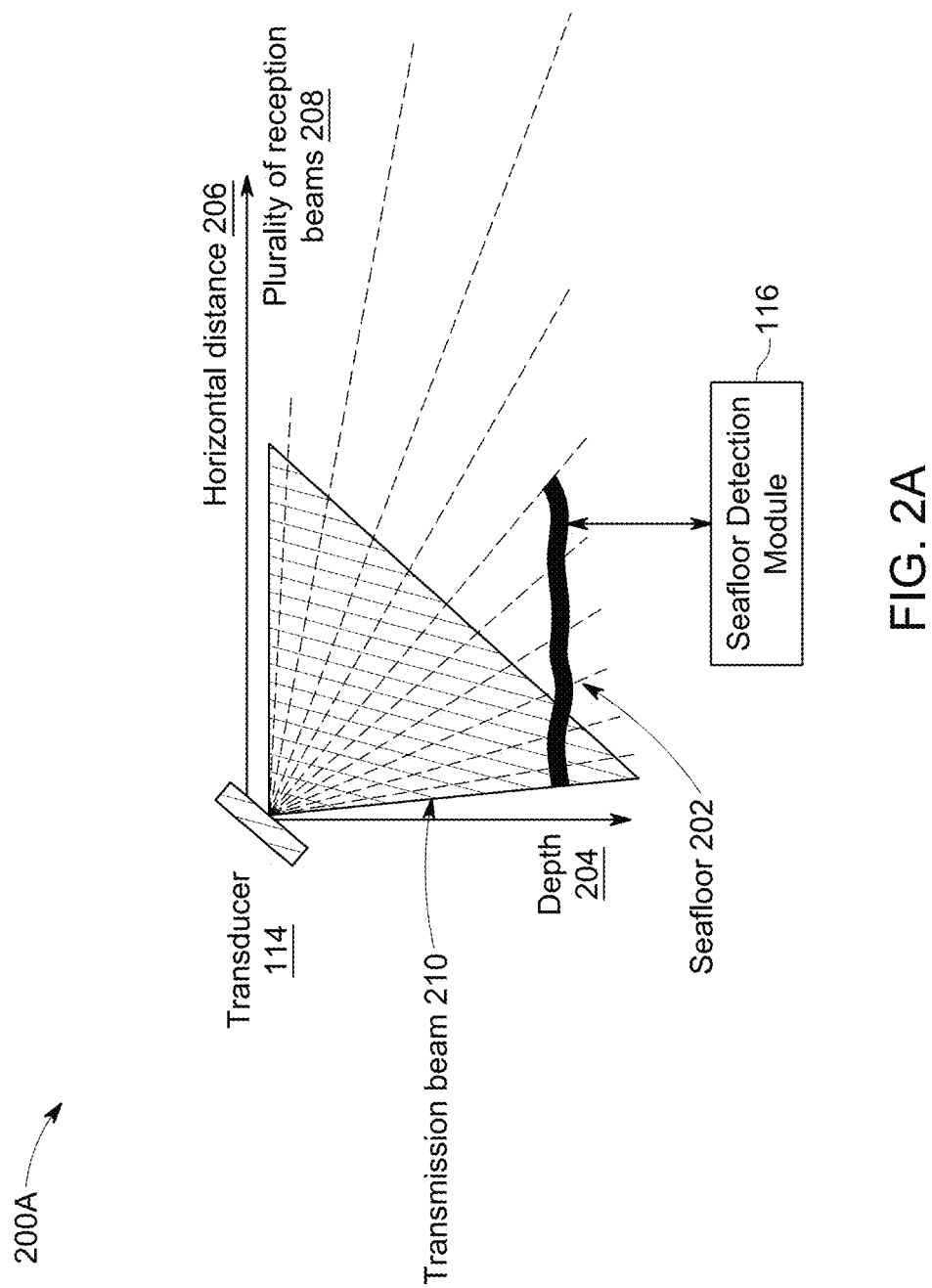
FIG. 2A is a diagram that represents a detected seafloor, in accordance with an example embodiment.

FIG. 2A is a diagram 200A that represents a detected seafloor 202, in accordance with an example embodiment. The diagram 200A depicts a direction of a depth 204 from the transducer 114 to the detected seafloor 202 in the water body. The diagram 200A further depicts a horizontal distance 206 from the transducer 114 of the sonar device 102 towards the potential shoal hazard. For example, the horizontal distance 206 may be in a direction of travel of the user device 104.

The transducer 114 projects the ultrasonic waves 108 in the water body in form of a transmission beam 210. For example, the transmission beam 210 is projected when one dimensional array of the plurality of transducer elements 114a is tilted at 45 degrees with the vertical plane. In an example, if the transducer elements 114a are arranged linearly in one dimension, beamforming may be performed in two dimensions. For example, if the sonar device 102 uses one dimensional array of the plurality of transducer elements 114a arranged in the vertical plane and inclined at 45 degrees with the vertical plane, the transducer 114 may transmit the transmission beam 210 with a fan shape. The fan shape is large in the vertical plane extending for example from 0 degree (horizontally, ahead of the user device 104) to 90 deg (vertically below the user device 104), and thin in a horizontal plane (e.g., few degrees). In such a case, the receiver 116 may form a plurality of reception beams 208 (e.g., every 1 degree) in the vertical plane, within the fan shape of the transmission beam 210.

In another example, if the plurality of transducer elements 114a are arranged in two dimensional array, beamforming may be performed in three dimensions. For example, if the sonar device 102 uses such array inclined at 45 degrees with the vertical plane, the transducer 114 may transmit the transmission beam 210 with a conical shape or any other shape. The conical shape may extend ahead of the user device 104, for example from 0 degree (horizontally, ahead of the user device 104) to 90 degrees (vertically below the user device 104). In such a case, the receiver 116 may form the plurality of reception beams 208 within the conical shape of the transmission beam 210. Each of the plurality of reception beams 208 thus formed is substantially contained within the range of the transmission beam 210.

The receiver 116 is configured to receive the reception signals from the plurality of transducer elements 114a based on the reflected ultrasonic waves transmitted in form of the transmission beam 210. The receiver 116 further generates the plurality of reception beams 208 based on the reception signals. Further, the plurality of reception beams 208 are utilized to detect the seafloor 202 with facilitation of the seafloor detection module 118. The seafloor 202 is only detected and plotted up to a certain horizontal distance as the detection of the seafloor 202 is based on a signal strength on the plurality of reception beams 208 reflected back from the seafloor 202. For example, the seafloor detection module 118 may be unable to detect the seafloor 202 based on a reception beam of the plurality of reception beams 208 with a weak reflection from the seafloor 202. Moreover, the seafloor detection module 118 may be able to detect the seafloor 202 based on a reception beam of the plurality of reception beams 208 with a strong reflection from the seafloor 202.

In general, when the signal strength on the reception beam of the plurality of reception beams 208 reflected from the seafloor 202 is less than a given threshold level, the seafloor 202 may be undetectable. Also, when angle of incidence of a reception beam on the seafloor increases, the signal strength on the reception beam decreases and therefore the seafloor 202 in the FIG. 2A is only displayed (i.e., detected) up to the certain horizontal distance. Further, a limit incidence angle may be determined for extrapolation of the shoal line beyond the detectable seafloor 202. Details of the determination of the limit incidence angle are further provided, for example, in FIGS. 2B, 2C and 2D.

Figure 2B:
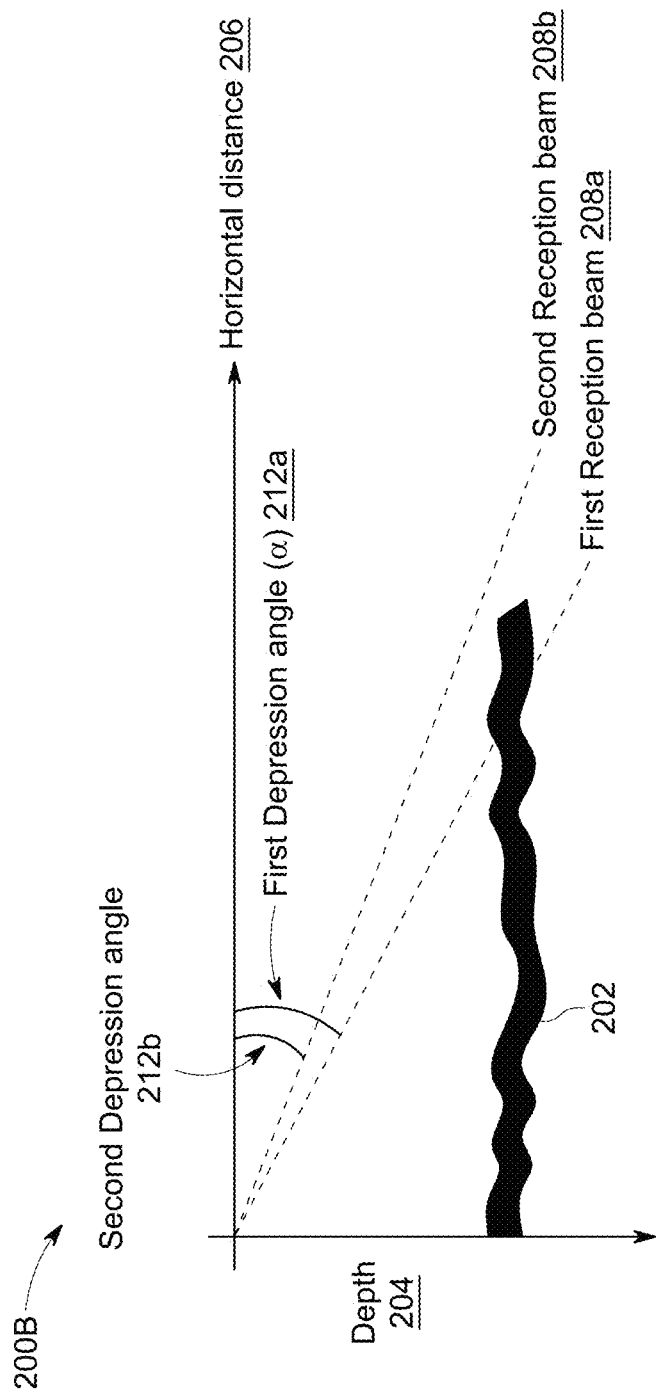
FIG. 2B is a diagram illustrating calculation of depression angles to determine a limit incidence angle, in accordance with an example embodiment.

FIG. 2B is a diagram 200B illustrating calculation of depression angles to determine a limit incidence angle, in accordance with an example embodiment. The depression angles may be angles between the plurality of reception beams 208 and the horizontal direction (horizontal distance 206). The plurality of reception beams 208 includes a first reception beam 208a on which the seafloor 202 is detectable, and a second reception beam 208b on which the seafloor 202 is non-detectable. The first reception beam 208a is in vicinity of the second reception beam 208b. The first reception beam 208a makes a first depression angle 212a with the horizontal distance 206. For example, the first depression angle 212a is denoted as an angle "α". The second reception beam 208b makes a second depression angle 210b with the horizontal distance 206.

The first depression angle 212a is a lowest depression angle at which the seafloor 202 is detectable. For example, the second reception beam 208b is a beam that is adjacent to the first reception beam 208a with the second depression angle 212b smaller than the first depression angle 212a of the first reception beam 208a. In an embodiment, the angle determination module 120 is configured to calculate at least the first depression angle 212a and the second depression angle 212b to identify the reception beam with the smallest depression angle which may detect the seafloor 202, such as the first reception beam 208a with the first depression angle 212a at which the seafloor 202 is detectable. Based on at least one of the first depression angle 212a and the second depression angle 212b, the limit incidence angle is determined using the angle determination module 120 of FIG. 1B. In an exemplary scenario, the first depression angle 212a may be 7 degrees. In such a case, the reception beams of the plurality of reception beams 208 with depression angles between a range of 7 degrees and 90 degrees may enable detection of the seafloor 202. Furthermore, the reception beams of the plurality of reception beams 208 with depression angles between a range of 0 degree and 7 degrees may be unable to detect the seafloor 202.

Figure 2C:
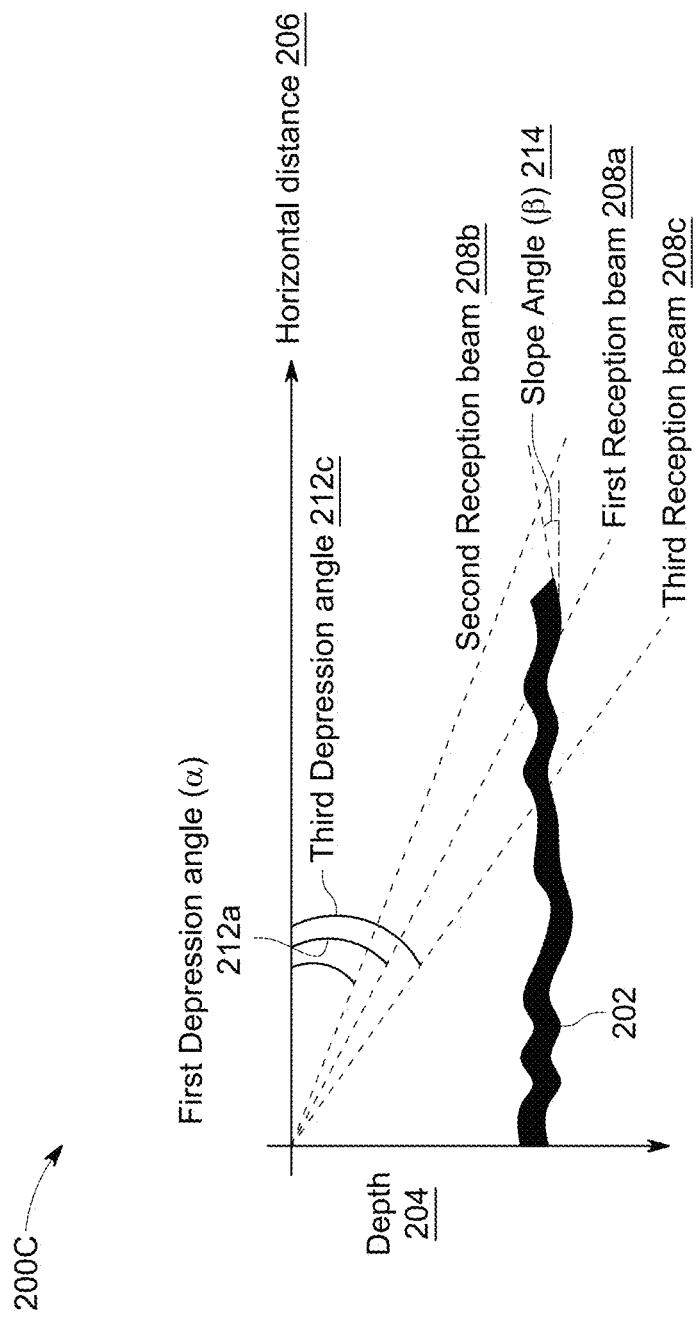
FIG. 2C is a diagram illustrating calculation of a slope angle to determine the limit incidence angle, in accordance with an example embodiment.

FIG. 2C is a diagram 200C illustrating calculation of a slope angle of the detected seafloor 202 to determine the limit incidence angle, in accordance with an example embodiment. The diagram 200C depicts the first reception beam 208a with the first depression angle 212a. The diagram 200C further depicts a third reception beam 208c with a third depression angle 212c. The third depression angle 212c is an angle between the third reception beam 208c and the horizontal direction (horizontal distance 206).

In an embodiment, the seafloor detection module 118 may be configured to determine the third depression angle 212c of the third reception beam 208c. The seafloor 202 is detectable at the third reception beam 208c of the plurality of reception beams 208. The third depression angle 212c is larger than the first depression angle 212a and the second depression angle 212b. The seafloor detection module 118 is further configured to calculate a slope angle 214 of the detected seafloor 202 with the horizontal direction based on the determined third depression angle 212c of the third reception beam 208c and the first depression angle 212a of the first reception beam 208a. For example, the slope angle 214 may be referred as the angle "β". In an embodiment, the first reception beam 208a and the third reception beam 208c may be consecutive reception beams of the plurality of reception beams 208 at which the seafloor 202 may be detectable. In another embodiment, the slope angle 214 may be calculated based on any non-consecutive reception beams of the plurality of reception beams 208 at which the seafloor 202 may be detectable. For example, the slope angle 214 may be calculated based on measurement of the depth 204 of the seafloor 202 with the two reception beams that could detect the seafloor 202, such as the first reception beam 208a and the third reception beam 208c. Further, the angle determination module 120 calculates the limit incidence angle 212a based on the calculated slope angle 214.

Figure 2D:
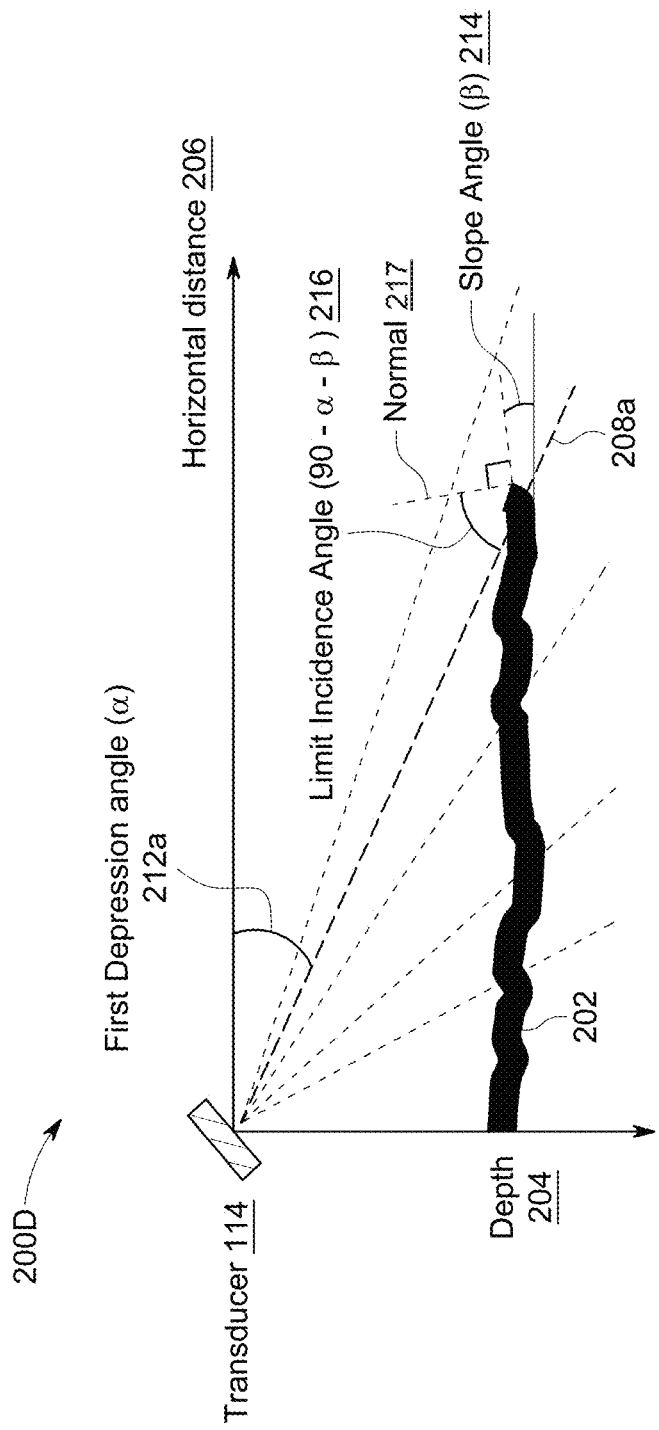
FIG. 2D is a diagram that illustrates determination of the limit incidence angle, in accordance with an example embodiment.

FIG. 2D is a diagram 200D that illustrates determination of a limit incidence angle 216, in accordance with an example embodiment. The limit incidence angle 216 is an angle between the first reception beam 208a incident on a surface of the detected seafloor 202 and a normal 217 to the surface of the detected seafloor 202.

The limit incidence angle 216 may be determined based on the calculation of the first depression angle 212a and the slope angle 214. In an embodiment, the angle determination module 120 may be configured to determine the limit incidence angle 216 based on the first depression angle 212a and the slope angle 214. The limit incidence angle 216 may be determined as:

The limit incidence angle=90 degrees−α−β (in degrees), where α is the first depression angle 212a and β is the slope angle 214.

Thus, the limit incidence angle 216 may be determined based on a sum of the first depression angle 212a and the slope angle 214 and subtracting the sum by 90 degrees. The limit incidence angle 216 may be utilized to extrapolate the shoal line. Details of the extrapolation of the shoal line are further provided, for example, in FIG. 2E.

Figure 2E:
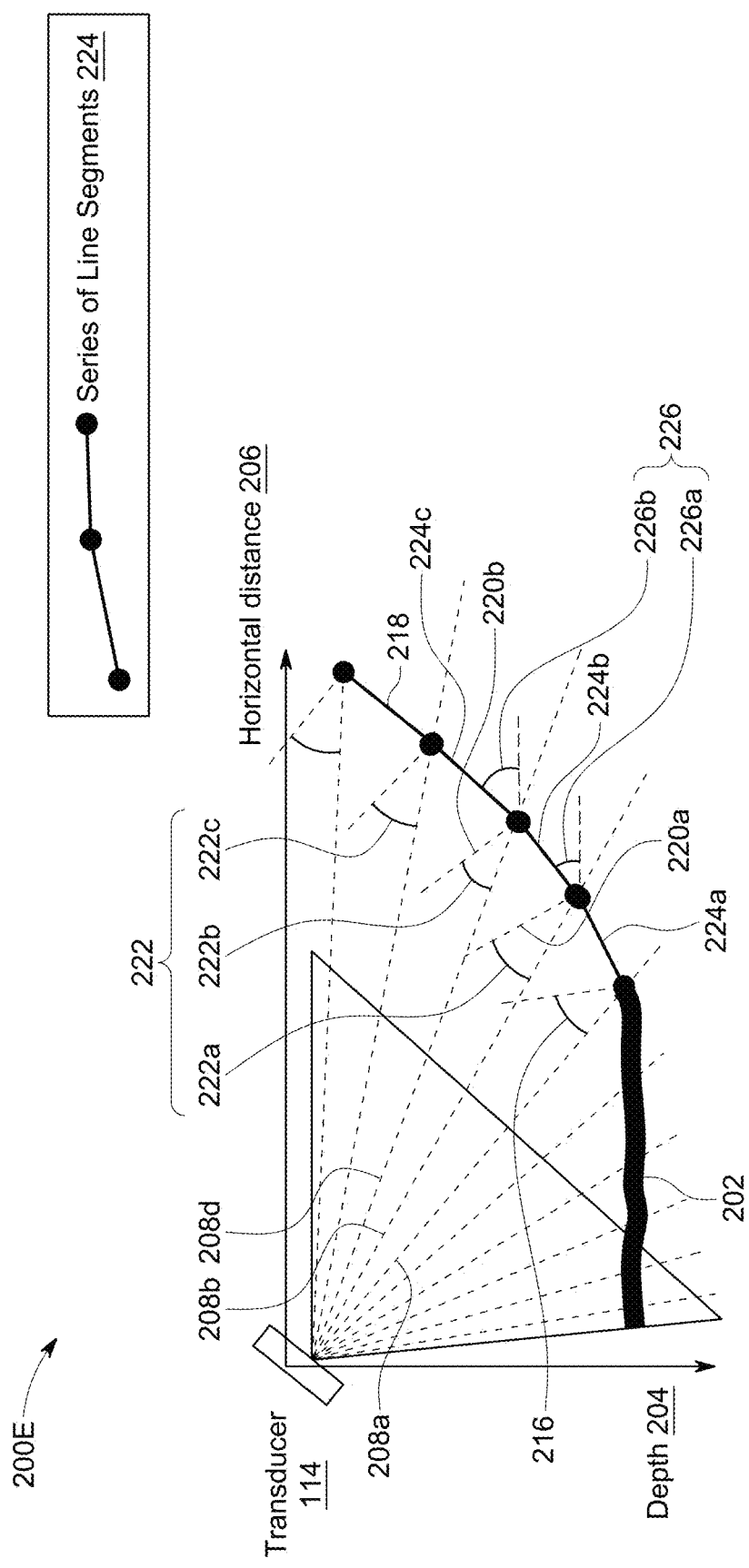
FIG. 2E is a diagram that illustrates extrapolation of a shoal line associated with a potential shoal, in accordance with an example embodiment.

FIG. 2E is a diagram 200E that illustrates extrapolation of a shoal line 218 associated with a potential shoal, in accordance with an example embodiment. The shoal line 218 is a line connecting to the detected seafloor 202 that extends towards the horizontal distance 206. The extrapolated shoal line 218 indicates a possibility of the potential shoal beyond the shoal line 218 as a worst-case scenario. As the seafloor 202 is detected only up to the specific point based on the reception beams with the strong reflection that enables detection of the seafloor 202, the shoal extrapolation module 122 extrapolates the shoal line 218 beyond the point at which the seafloor 202 is undetectable.

In some embodiments, the shoal extrapolation module 122 is configured to extrapolate the shoal line 218 based on at least one reception beam, such as the second reception beam 208b of the plurality of reception beams 208 intersecting a normal, such as a normal 220a, to a tangent of the shoal line 218 at a point on the shoal line 218. The at least one reception beam and the normal make an angle of incidence, such as an angle of incidence 222a of a set of angles of incidence 222. The angle of incidence 222a is set based on the limit incidence angle 216.

In some embodiments, the shoal line 218 is extrapolated as a series of line segments 224. The series of line segments 224 includes, for example, a first line segment 224a, a second line segment 224b, a third line segment 224c and so forth. The series of line segments 224 may include more line segments than the mentioned line segments. The first line segment 224a of the series of line segments 224 is placed between the detected seafloor 202 and the second line segment 224b of the series of line segments 224. In other words, one end of the first line segment 224a connects to the detected seafloor 202 and the other end of the first line segment 224a connects to one end of the second line segment 224b. The other end of the second line segment 224b connects to the third line segment 224c and so forth.

In an embodiment, each line segment of the series of line segments 224 is extrapolated between two reception beams of the plurality of reception beams 208. In an exemplary scenario, the shoal line 218 is extrapolated based on the reception beams of the plurality of reception beams 208 at which the seafloor 202 is undetectable. For example, the first line segment 224a is extrapolated between the first reception beam 208a and the second reception beam 208b. The first line segment 224a is extrapolated based on the second reception beam 208b intersecting the normal 220a to the tangent of the shoal line 218 at a point on the shoal line 218, the second reception beam 208b and the normal 220a making the angle of incidence 222a. In the example of FIG. 2E, said intersecting point corresponds to the common ends of the first and second line segments 224a and 224b. Similarly, the second line segment 224b is extrapolated between the second reception beam 208b and a fourth reception beam 208d of the plurality of reception beams 208. The second line segment 224b is extrapolated based on the fourth reception beam 208d intersecting a normal 220b to the tangent of the shoal line 218 at a point on the shoal line 218, the fourth reception beam 208d and the normal 220b making an angle of incidence 222b of the set of angles of incidence 222. In a similar manner, a subsequent line segment (such as the third line segment 224c) to the second line segment 224b is extrapolated based on a fifth reception beam intersecting a normal to the tangent of the shoal line 218 at a point on the shoal line 218, the subsequent line segment and the normal making an angle of incidence 222c of the set of angles of incidence 222. Subsequent line segments may be extrapolated until one line segment intersects water surface (such as sea surface, or surface of the water body).

In an embodiment, the angle of incidence 222a, the angle of incidence 222b and the angle of incidence 222c of the set of angles of incidence 222 are equal. The set of angles of incidence 222 is set based on the limit incidence angle 216. For example, the set of angles of incidence 222 may be set equal to the limit incidence angle 216. In an exemplary scenario, the limit incidence angle 216 may be 83 degrees. In such a case, the set of angles of incidence 222 may be set as 83 degrees.

Moreover, each line segment of the series of line segments 224 is associated with a slope angle of a set of slope angles 226. For example, the second line segment 224b of the series of line segments 224 makes a first slope angle 226a of the set of slope angles 226 with the horizontal plane. In addition, the third line segment 224c of the series of line segments 224 makes a second slope angle 226b of the set of slope angles 226, different from the first slope angle 226a, with the horizontal plane. In an embodiment, the first slope angle 226a of the second line segment 224b is smaller than the second slope angle 226b of the third line segment 224c. For example, the slope angles, such as the first slope angle 226a and the second slope angle 226b may be adjusted to adjust or set the set of angles of incidence 222 to be substantially equal to the limit incidence angle 216. The setting of the set of angles of incidence 222 is explained, for example, in FIG. 2G and FIG. 2H.

FIG. 2F is a diagram 200F that illustrates the extrapolated shoal line 218, in accordance with an example embodiment. In an example, if a number of reception beams of the plurality of reception beams 208 increases, a number of the line segments of the series of line segments 224 may further increase. Thus, if the number of the reception beams increases, the angle between two consecutive reception beams becomes very small, and each line segment between the two consecutive reception beams becomes so short that the shoal line 218 would appear as a curved line. Therefore, the shoal line 218 is extrapolated as a series of points constituting the line.

Figure 2G:
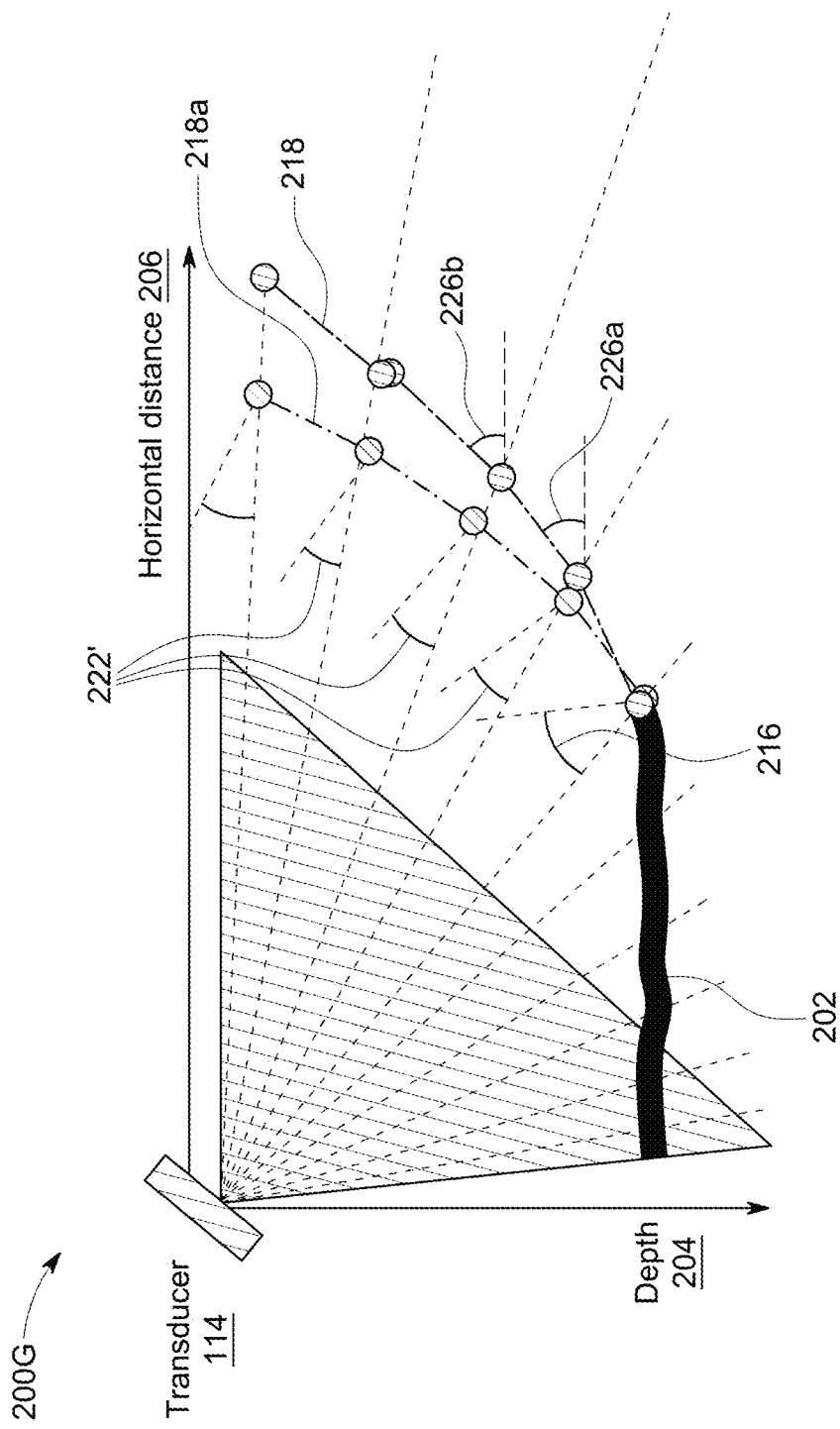
FIG. 2G is a diagram that illustrates an angle of incidence set less than the limit incidence angle, in accordance with an example embodiment.

FIG. 2G is a diagram 200G that illustrates an angle of incidence 222' set less than the limit incidence angle 216, in accordance with an example embodiment. In some embodiments, the shoal extrapolation module 122 is further configured to set the angle of incidence 222' based on a sum of the limit incidence angle 216 and a safety factor. The safety factor is a positive value, a negative value, or zero. For example, the safety factor is a real number.

Angle of incidence 222'=limit incidence angle 216+safety factor, where the safety factor is zero, a positive number or a negative number.

If the angle of incidence 222 is adjusted to be smaller than the limit incidence angle 216, the extrapolated shoal line 218 reaches water surface quicker. For example, the shoal line 218 is extrapolated based on the setting of the angle of incidence 222 to be equal to the limit incidence angle 216 (such as by setting the safety factor as zero). In such a case, the shoal line 218 may reach the water surface slowly. In another example, a shoal line 218a is extrapolated based on the setting of the angle of incidence 222' to be less than the limit incidence angle 216 (such as setting the safety factor as a negative number). In such a case, the shoal line 218a may reach the water surface faster than the shoal line 218.

In an embodiment, the slope angles, such as the first slope angle 226a and the second slope angle 226b may be adjusted to set the set of angles of incidence 222 associated with the shoal line 218 to be less than the limit incidence angle 216. Thus, the shoal line 218a with the set of angles of incidence 222' may be obtained by setting the set of angles of incidence 222 associated with the shoal line 218 to be less than the limit incidence angle 216.

In an exemplary scenario, the limit incidence angle 216 may be 83 degrees, thus, the set of angles of incidence 222 may also be 83 degrees and for example, the safety factor may be −2 degrees. Thus, the adjusted angle of incidence or the set of angles of incidence 222' may be 83+(−2)=81 degrees. In such a manner, the shoal line 218a may be obtained with the set of angles of incidence 222' to be 81 degrees. The operator 106 of the sonar device 102 may do such adjustments to increase safety of the user device 104.

Figure 2H:
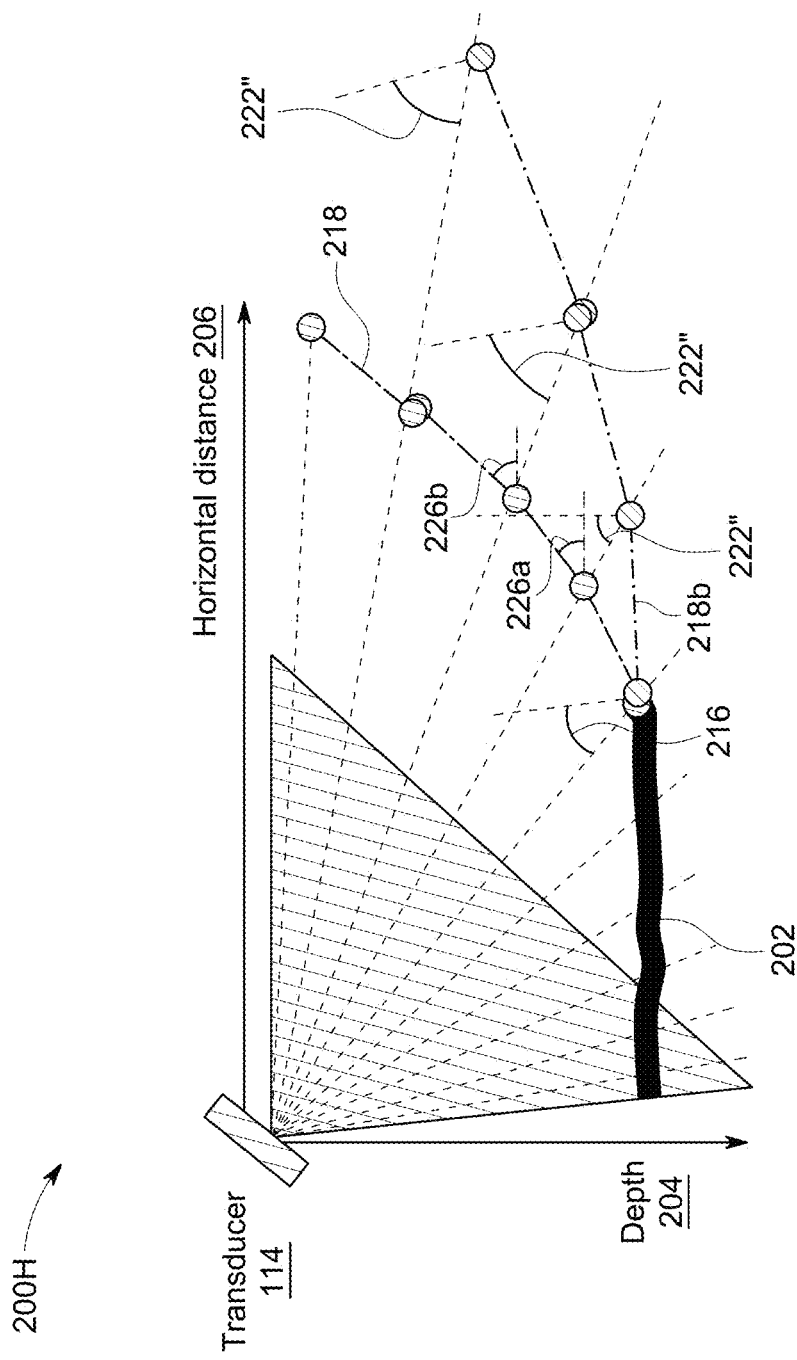
FIG. 2H is a diagram that depicts the angle of incidence set more than the limit incidence angle, in accordance with an example embodiment.

FIG. 2H is a diagram 200H that depicts an angle of incidence 222" set more than the limit incidence angle, in accordance with an example embodiment.

If the angle of incidence 222 is adjusted to be greater than the limit incidence angle 216 (such as setting the safety factor as a positive number), the extrapolated shoal line 218 reaches water surface slower. For example, a shoal line 218b is extrapolated based on the setting of the angle of incidence 222 to be more than the limit incidence angle 216. In such a case, the shoal line 218b may reach the water surface slower than the shoal line 218.

In an embodiment, the slope angles, such as the first slope angle 226a and the second slope angle 226b may be adjusted to set the set of angles of incidence 222 associated with the shoal line 218 to be more than the limit incidence angle 216. Thus, the shoal line 218b with the set of angles of incidence 222" may be obtained by setting the set of angles of incidence 222 associated with the shoal line 218 to be more than the limit incidence angle 216.

In an exemplary scenario, the limit incidence angle 216 may be 83 degrees, thus, the set of angles of incidence 222 may also be 83 degrees and for example, the safety factor may be 2 degrees. Thus, the adjusted angle of incidence or the set of angles of incidence 222" may be 83+2=85 degrees. In such a manner, the shoal line 218b may be obtained with the set of angles of incidence 222" to be 85 degrees. Based on the extrapolated shoal line 218, the depth of the extrapolated shoal line may be determined. Details of the determination of the depth of the extrapolated shoal line 218 are further provided, for example, in FIG. 2I.

Figure 2I:
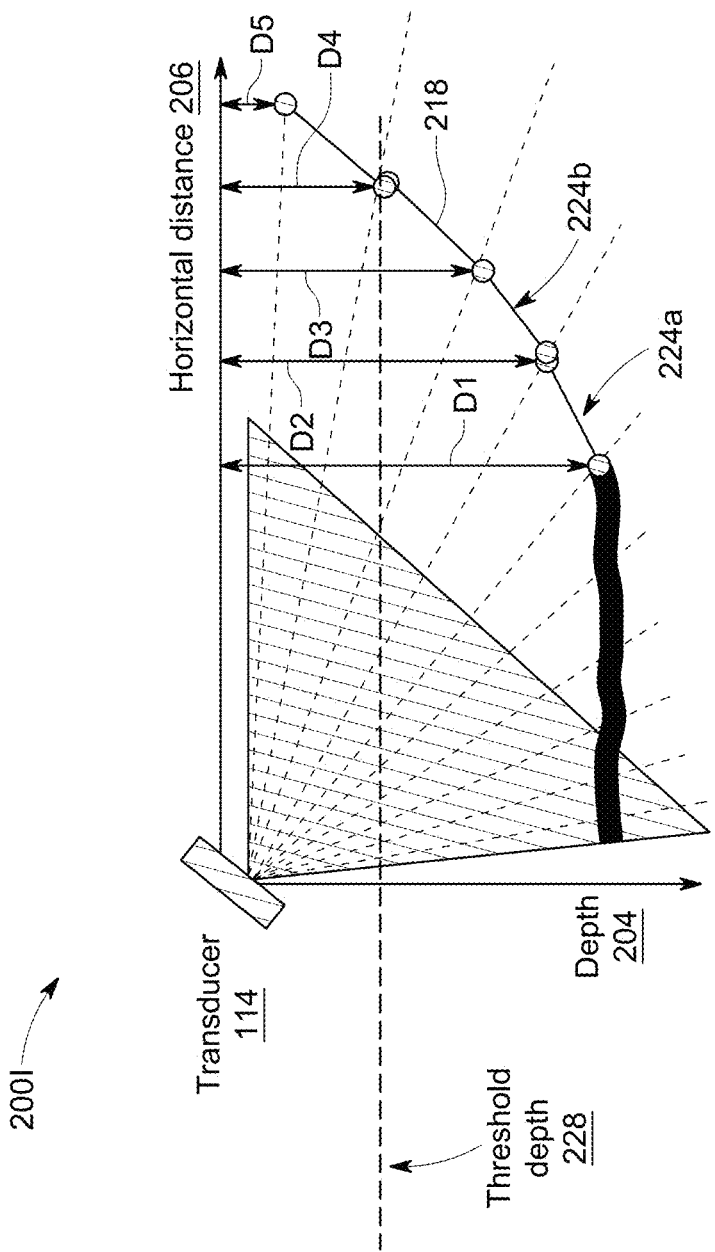
FIG. 2I is a diagram that illustrates depth of the extrapolated shoal line at each line segment of the series of line segments, in accordance with an example embodiment.

FIG. 2I is a diagram 200I that illustrates depth of the extrapolated shoal line 218 at each line segment of the series of line segments 224, in accordance with an example embodiment. Once the shoal line 218 is extrapolated, the depth 204 of the extrapolated shoal is determined with facilitation of the hazard calculation module 124. The hazard calculation module 124 is configured to determine the depth 204 associated with the extrapolated shoal line 218. The depth 204 associated with the extrapolated shoal line 214 is a distance between a point on the shoal line 218 and the horizontal distance 206 or the water surface. Thus, the depth 204 may indicate a vertical distance between the potential shoal hazard and the water surface.

In an exemplary scenario, the hazard calculation module 124 may determine the depth 204 at several points on the extrapolated shoal line 218. For example, the hazard calculation module 124 may determine a first depth D1, a second depth D2, a third depth D3, a fourth depth D4, and a fifth depth D5. For example, the first depth D1 may be determined from the horizontal distance 206 to the one end of the first line segment 224*a*. The second depth D2 may be determined from the horizontal distance 206 to the other end of the first line segment 224*a* or the one end of the second line segment 224*b*. Similarly, the third depth D3 may be determined from the horizontal distance 206 to the other end of the second line segment 224*b* and so forth.

Furthermore, the hazard calculation module 124 is configured to detect the potential shoal hazard based on a determination that the determined depth 204 associated with the extrapolated shoal line 218 is less than a threshold depth 228. The threshold depth 228 may indicate a seafloor depth below which it is not safe for the user device 104 to navigate in the water body. Thus, when the depth 204 associated with the extrapolated shoal line 218 is determined to be less than the threshold depth 228, the potential shoal hazard may be detected.

In an exemplary scenario, the determined first depth D1, the second depth D2, the third depth D3, the fourth depth D4 and the fifth depth D5 of the extrapolated shoal line 218 are utilized by the hazard calculation module 124 to determine the potential shoal hazard. As the fourth depth D4 and the fifth depth D5 are less than the threshold depth 228, a portion of the shoal line 218 between the fourth depth D4 and the fifth depth D5 or the portion of the shoal line 218 above the threshold depth 228 indicates the potential shoal hazard.

Furthermore, the hazard calculation module 124 is configured to calculate a horizontal distance from the transducer 114 to the detected potential shoal hazard. For example, the horizontal distance from the transducer 114 to a point on the portion of the shoal line 218 above the threshold depth 228 may be calculated.

In some embodiments, the calculated horizontal distance and/or the detected potential shoal hazard and/or the detected seafloor 202 is displayed on the display 128. For example, a top view of the user device 104 with the extrapolated shoal line 218 and the corresponding calculated horizontal distance may be displayed on the display 128. Details of the displayed horizontal distance and the potential shoal hazard are further provided, for example, in FIG. 8.

In some embodiments, the hazard calculation module 124 is further configured to calculate a time of expected collision of the user device 104 with the potential shoal hazard based on the calculated horizontal distance and speed of the user device 104. For example, the speed of the user device 104 may be 20 knots and the calculated horizontal distance may be 500 meters. In such a case, based on the speed of the user device 104 and the horizontal distance, the time of expected collision may be calculated. Such time of expected collision of the user device 104 may be utilized by the operator 106 to ensure safety of the user device 104.

In an embodiment, the range of the limit incidence angle 216 is between 50 and 85 degrees. Beyond the range of the detected seafloor 202, a worst-case model of the potential shoal may be generated by extrapolation of the shoal line 218. The worst-case model ensures that rocks, cliffs and other changes above the shoal line 218 return a sonar target and are detected as an imminent threat to navigation of the user device 104. Beyond the shoal line 218, the potential shoal 602 may be present, as a worst-case scenario. The angle of incidence 222 may be determined based on the limit incidence angle 216 and the safety factor explained in FIG. 2G and FIG. 2H.

Furthermore, simulation results of the extrapolated shoal line 218 are shown further in FIGS. 3A and 3B with different angle of incidence 222.

FIG. 3A is a first tabular representation 300A of simulation results for extrapolation of the shoal line 218, in accordance with an example embodiment. The first tabular representation 300A depicts simulation results of computed incremental shoaling with 83 degree limit incidence angle 216 for a 5 meter deep flat seafloor, and 83 degree angle of incidence 222 for the extrapolation of the shoal line 218.

The first tabular representation 300A includes a plurality of rows, a plurality of columns and a plurality of cells. Each cell of the plurality of cells may represent an intersection of each row of the plurality of rows with each column of the plurality of columns.

The first tabular representation 300A includes the plurality of columns, including, for example, a horizontal distance 302 in meters (m), a horizontal distance 304 measured in depth, an angle of incidence 306 measured in degrees, an angle of undetectable shoal 308 measured in degrees, shoaling 310 measured in percentage depth, an accumulated shoaling 312 measured in percentage depth, shoal depth percentage 314, and shoal depth 316 in meters. Furthermore, the plurality of columns represents the underlying values as the results of the computed incremental shoaling with the angle of incidence 222 (or maximum detection incidence in the first tabular representation) set as 83 degrees, the limit incidence angle 216 (or a current beam detection in the first tabular representation) set as 83 degrees, an increment or a factor of depth set as 1, and the seafloor depth 204 set as 5 meters.

The first tabular representation 300A represents an example working for 83 degree angle of incidence computed once for each depth multiple. For example, at the horizontal distance 206 of 8× the depth 204 (i.e., 40 m), the seafloor 202 detection is present. For the next 1× depth (8-9× depth period), there is just under 1-degree slope that may not be detected and thus, contributes to a possible shoaling of just over 1% of the depth 204. In this manner, the extrapolating of the shoal line 218 is performed until a total accumulated 1× the depth 204 (or the surface of the ocean) is reached: in this particular example, it is reached at a horizontal distance of 25× the depth.

In an example, consider the user device 104 or the vessel with a draft of 0.9 m, and the seafloor depth of 5 m. Let us assume a simplified model of angle of incidence 222 at 83 degrees, then the user device 104 is expected to run aground at 0.2× depth (=1 m). With reference to the accumulated shoaling (% depth) 312 column, it may be observed that it occurs at a horizontal distance of 115 m. Thus, by applying the worst-case model with a 5 m deep seafloor, it is determined that there is no hazard to navigation at 40 m, when mapping (i.e., detection) limit occurs. Also, there is no hazard in that direction for at least 115 m.

FIG. 3B is a second tabular representation 300B of the simulation results for extrapolation of the shoal line 218, in accordance with an example embodiment. The second tabular representation 300B depicts the simulation results of computed incremental shoaling with 83 degree limit incidence angle 216 for a 10 meter deep flat seafloor, and 80 degree angle of incidence 222 for the extrapolation of the shoal line 218.

The second tabular representation 300B also includes the plurality of columns, including, for example, the horizontal distance 302 in meters (m), the horizontal distance 304 measured in depth, the angle of incidence 306 measured in degrees, the angle of undetectable shoal 308 measured in degrees, the shoaling 310 measured in percentage depth, the accumulated shoaling 312 measured in percentage depth, shoal depth percentage 314, and the shoal depth 316 in meters. Furthermore, the plurality of columns represents the underlying values as the results of the computed incremental shoaling with the angle of incidence 222 (or the maximum detection incidence in the second tabular representation) set as 80 degrees, the limit incidence angle 216 (or the current beam detection in the second tabular representation) set as 83 degrees, the increment or the factor of depth set as 1, and the seafloor depth 204 set as 10 meters.

It may be noted that the results illustrated in the first and second tabular representations 300A, 300B improve the confidence for navigation purposes. However, it is to be noted that this model is more complicated in practice as the seafloor 202 may not be uniformly flat. Also, if the seafloor 202 may be rising as the seafloor detection is made, then the initial shoal angle (such as the slope angle) would be higher than 1 degree, the converse is true with the seafloor sloping away from the vessel or the user device 104. Also, the model is complicated when accounting for slope in the other plane which needs to be accounted for with adequate tolerances (for e.g., when the seafloor 202 is made of different materials.

In a case where the safety factor is required, the angle of incidence of 80 degrees may be used as shown in the second tabular representation 300B. The angle of incidence may be set as 80 degrees based on the safety factor and the limit incidence angle 216. In an exemplary scenario, the safety factor is −3 degrees. In such a case, the angle of incidence may be 83+(−3)=80 degrees.

It may be noted that, as explained above in FIG. 2D, the limit incidence angle 216 may be determined based on the first depression angle 212a and the slope angle 214. In accordance with another embodiment, instead of using the limit incidence angle 216 achieved by the seafloor 202 detection process as a guide for the achievable incidence, the angle determination module 120 is configured to determine the limit incidence angle 216 based on a preset value of the limit incidence angle 216 or an adjustment of the preset value of the limit incidence angle 216 through the user interface 130 of the sonar device 102. For example, the user interface 130 may be utilized by the operator 106 to adjust the limit incidence angle 216. In some embodiments, the preset value of the limit incidence angle 216 may be between 50 and 85 degrees. In an exemplary scenario, the preset value of the limit incidence angle 216 may be 83 degrees. The preset value of 83 degrees may be adjusted by the operator 106 to, for example, 81 degrees as per requirement of the operator 106. Other equivalent preset values of the limit incidence angle 216 may be set, without deviating from the scope of the present disclosure.

In an exemplary scenario, in case of 50 degrees of the limit incidence angle 216, a rapid shoaling beyond detection range may be observed. In case of 85 degrees of the limit incidence angle 216, a gentle shoaling may be observed. In cases where the specified angle of incidence is greater than the incidence achieved by the seafloor 202 detection, there may be various options, for example, it may be assumed that the seafloor 202 is levelled until the specified angle of incidence has been achieved, a fixed slope may be created from the last detection and may further be used as a lower limit on the depth 204 that is, a slope computed at 90 degrees of angle of incidence.

Generally, there exists a need that objects or slopes that are detected beyond the extent of seafloor 202 detection may be clearly illuminated. Moreover, shoal free distance computation near the sonar device 102 detection limits requires similar handling, and in many cases the sonar detection range may form the worst-case model for clearance visibility. Within the sonar device 102 detection limits, a confidence of the operator 106 in the lack of shoaling derives from the fact that if the seafloor 202 were to shoal more suddenly for any reason this would present a lower angle of incidence and thus an object would be detected. If an object is detected and the height of the object can be accurately resolved, then this can be used as the minimum depth and detection range.

Figure 4:
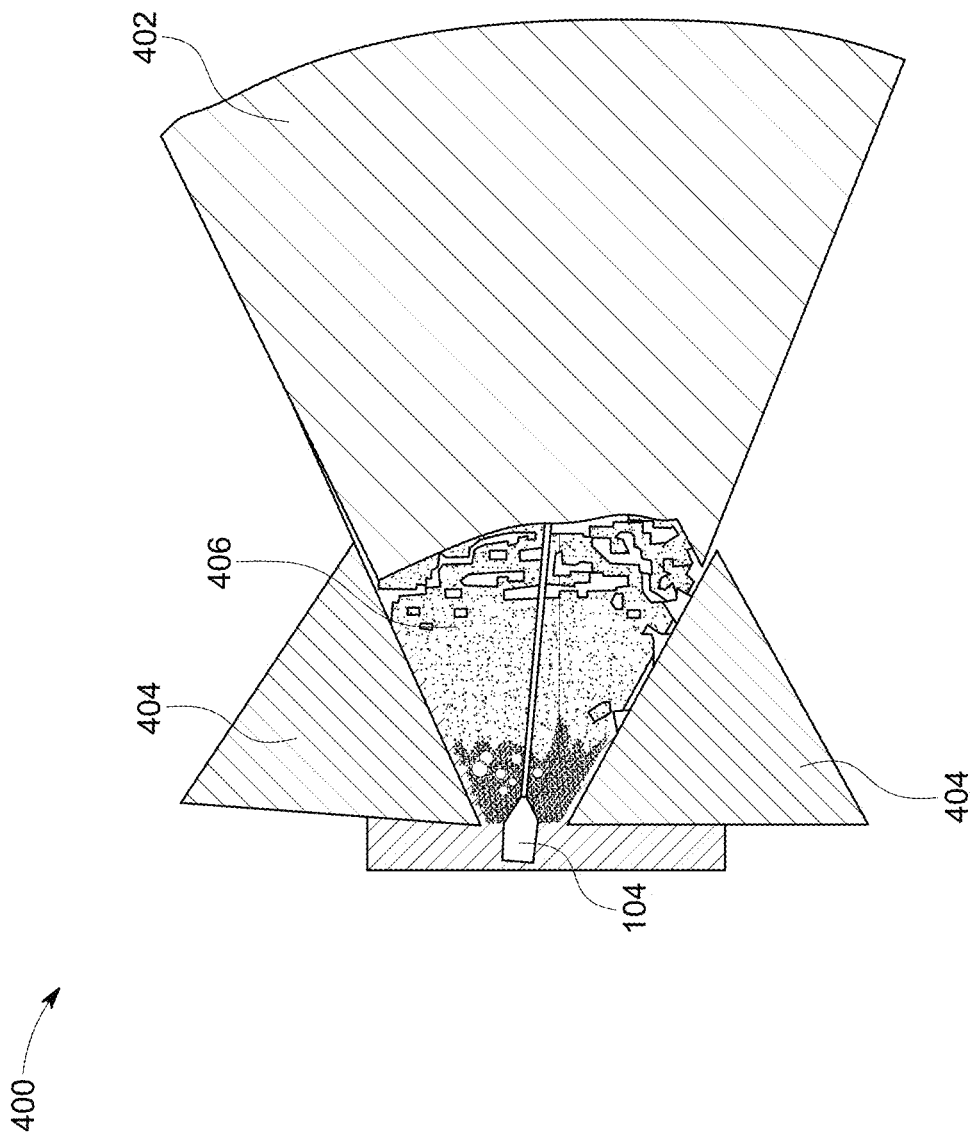
FIG. 4 is a diagram that illustrates area of valid non-detectability of the potential shoal, in accordance with an example embodiment.
Figure 5B:
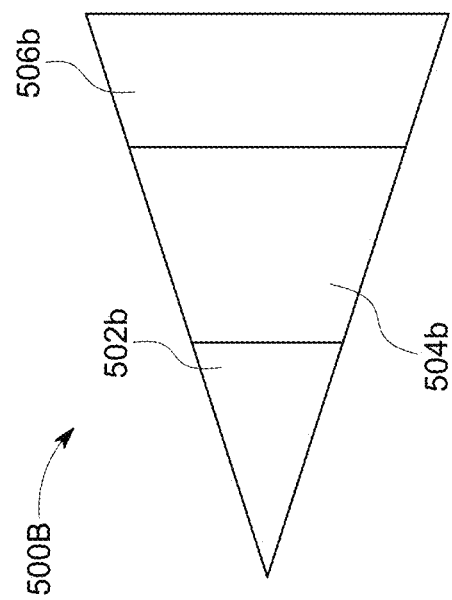
FIG. 5A, FIG. 5B, FIG. 5C, and FIG. 5D collectively illustrates schematic views of a range of area of seafloor detection vs a range of area of shoaling extrapolation for different conditions of a water body, in accordance with an example embodiment.
Figure 5A:
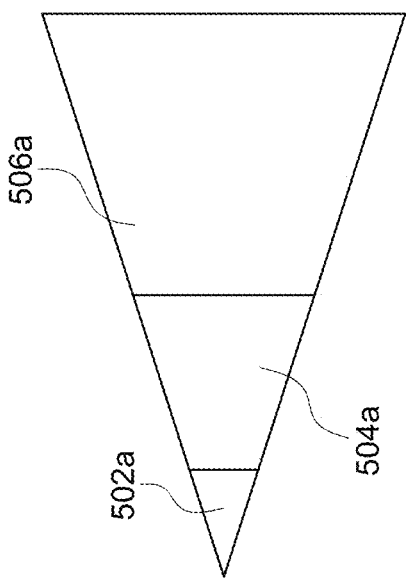
Figure 5D:
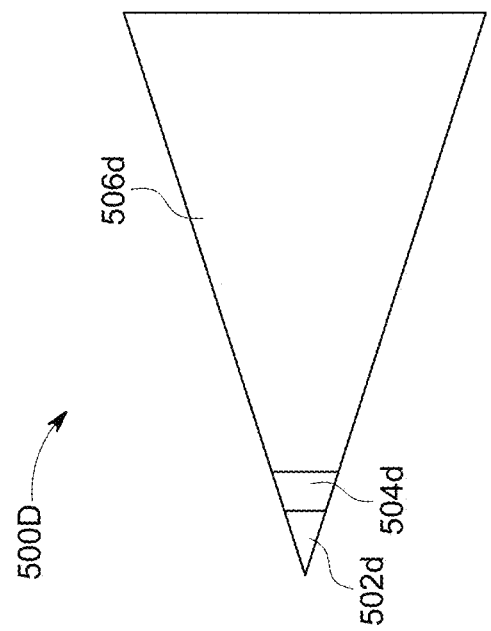
Figure 5C:
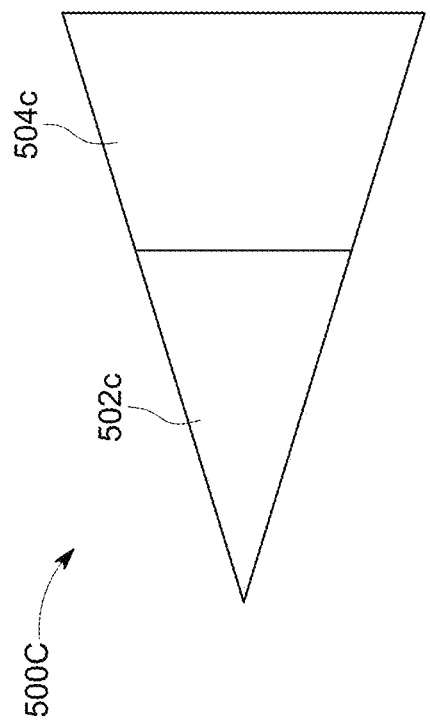

FIG. 4 is a diagram 400 that illustrates area of valid non-detectability of the potential shoal, in accordance with an example embodiment. The diagram 400 depicts a bird's eye view of an area 402 of valid non-detectability of the potential shoal and blind spot area 404 for the user device 104. The diagram 400 further depicts an area 406 in which the seafloor 202 is detectable. For example, the bird's eye view may be generated by utilization of a three-dimensional (3D) forward looking system. The sonar device 102 may use the 3D forward looking system to generate the bird's eye view.

The area 402 may be quantified as the area of valid non-detectability as the area 402 lies in the range of the user device 104. Thus, if a target object, such as the rock inside the area 402 has adequate reflectability, the target object may be identified as the potential hazard. In an exemplary scenario, the sonar device 102 produces one ping (e.g., the conical shaped transmission beam). For a given time instant, there may be no information about the area, such as the blind spot area 404 outside the horizontal beamwidth. However, the blind spot area 404 may be irrelevant for the shoal detection, as the user device 104 may not travel in the blind spot area 404.

The limit incidence angle 216 may be determined for the seafloor 202 in the area 406 based on the detectability of the seafloor 202. The shoal line 218 may further be extrapolated by use of the limit incidence angle 216 in front of the user device 104 in the area 402. Moreover, outputting the shoal line 218 as a safety mask, further information about the area 402 may be provided without actual mapping in the area 402. For example, the object, such as a large rock or a sudden change in slope, such as the cliff area 402 may be registered as the hazard.

FIGS. 5A-5D collectively illustrate schematic views 500A-500D of a range of area of seafloor detection vs a range of area of shoaling extrapolation for different conditions of the water body, in accordance with an example embodiment. The different conditions of the water body may include, for example, an amount of reflectivity of the ultrasonic waves 108 on the seafloor and the amount of depth 204 of the water body. In an embodiment, the schematic views 500A-500D may be generated by the 3D forward looking system.

The schematic views 500A-500D depict the bird's eye view of area in the range of conical shaped transmission beam. The schematic views 500A-500D show raw output of the worst-case model applied multiple times in different conditions of the water body.

A schematic view 500A depicts an area 502a corresponding to detected seafloor 202, an area 504a corresponding to the extrapolated shoal line 218 and a warning area 506a. The schematic view 500A considers a case of high amount of reflectivity of the ultrasonic waves 108 and a shallow depth of the water body. In such a case, the area 502a is a small fraction of an acquisition range of the sonar device 102. The sonar device 102 may transmit energy parallel to the surface of the seafloor 202. Further, the area 504a corresponding to the extrapolated shoal line 218 is greater than the area 502a corresponding to detected seafloor 202. Moreover, the warning area 506a is generated when the depth of the extrapolated shoal line 218 is less than the threshold depth 228. Thus, such information of the warning area 506a may be provided as the potential hazard to the operator 106.

The worst-case shoaling is displayed to the operator 106 to notify when a warning or critical depth limit is reached. The critical depth may be associated with dimensions of the user device 104, such as a draft of a vessel which may be the user device 104. In addition, the warning depth (such as a warning area) may be associated with the dimensions of the user device 104 plus a desired clearance.

A schematic view 500B depicts an area 502b corresponding to detected seafloor 202, an area 504b corresponding to the extrapolated shoal line 218 and a warning area 506b. The schematic view 500B considers a case of high amount of reflectivity of the ultrasonic waves 108 and a middle depth of the water body. In such a case, the range of the seafloor detection is higher, such that the seafloor 202 is detected till a longer horizontal distance 206. Therefore, the area 502b corresponding to detected seafloor 202 is more as compared to the area 502a corresponding to detected seafloor 202. In addition, the area 504b corresponding to the extrapolated shoal line 218 is more than the area 504a corresponding to the extrapolated shoal line 218. Moreover, the warning area 506b is less than the warning area 506a. Thus, in the case of high amount of reflectivity of the ultrasonic waves 108 and the middle depth of the water body, the range of detection of the seafloor 202 and the extrapolated shoal line 218 may be similar.

A schematic view 500C depicts an area 502c corresponding to detected seafloor 202 and an area 504c corresponding to the extrapolated shoal line 218. The schematic view 500C considers a case of high amount of reflectivity of the ultrasonic waves 108 and a deep water body. In such a case, the range of the seafloor detection in the deep water body is more than the range of the seafloor detection in case of the shallow depth and the middle depth of the water body. Therefore, the area 502c corresponding to detected seafloor 202 is more as compared to the area 502a and the area 502b corresponding to the detected seafloor 202. In addition, the area 504c corresponding to the extrapolated shoal line 218 is less than the area 502c corresponding to detected seafloor 202. It may be noted that the warning area is absent in the schematic view 500C as the sonar device 102 is able to detect the seafloor 202 to a larger horizontal distance 206. Thus, in the case of high amount of reflectivity of the ultrasonic waves 108 and the deep water body, the range of detection of the seafloor 202 is more than the range of extrapolated shoal line 218. Such a detection may be useful as the potential shoal hazard may need to be detected for a smaller area, such as area 504c.

A schematic view 500D depicts an area 502d corresponding to detected seafloor 202, an area 504d corresponding to the extrapolated shoal line 218 and a warning area 506d. The schematic view 500D considers a case of bad amount of reflectivity of the ultrasonic waves 108 and the shallow water body. In such a case, the range of the seafloor detection with the bad amount of reflectivity and shallow depth is least as compared to the range of the seafloor detection in case of the high reflectivity, middle depth and deep water body. Therefore, the area 502d corresponding to detected seafloor 202 is least as compared to the area 502b and the area 502c corresponding to the detected seafloor 202. In addition, the area 504d corresponding to the extrapolated shoal line 218 is less than the area 504a, the area 504b and the area 504c corresponding to extrapolated shoal line 218. Moreover, due to bad amount of reflectivity of the ultrasonic waves 108, the warning area 506d is very large.

Thus, in shallow waters, and bad reflectivity situations, the detection of the objects may be the least, thus, the clearance area for the user device 104 may be less. Therefore, the area 504d corresponding to the extrapolated shoal line 218 is less and the warning area 506d is large. A 3D representation of an exemplary area corresponding to the detected seafloor 202 and the potential shoal for the user device 104 is further provided, in FIG. 6.

Figure 6:
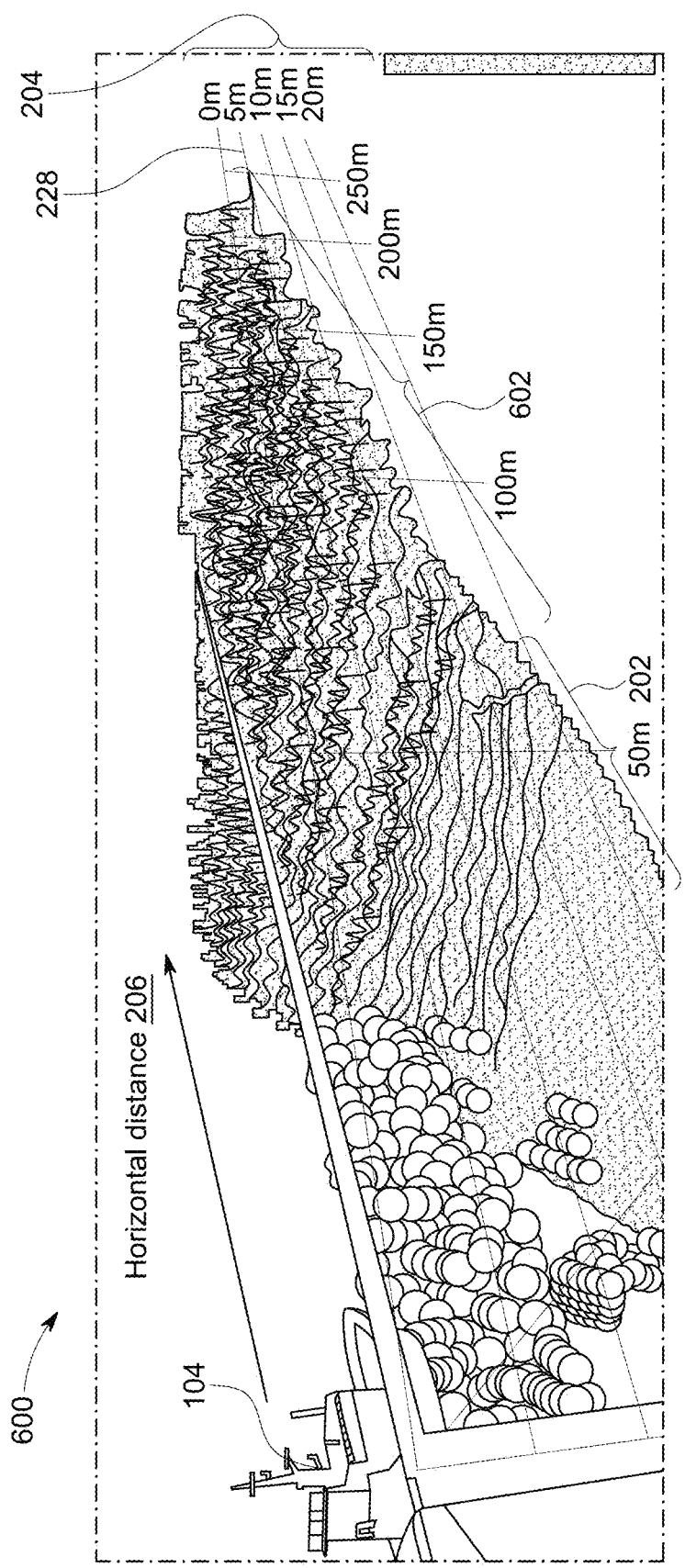
FIG. 6 is a diagram depicting three-dimensional (3D) representation of the detected seafloor and the potential shoal, in accordance with an example, embodiment.

FIG. 6 is a diagram 600 depicting the 3D representation of the detected seafloor 202 and a potential shoal 602, in accordance with an example embodiment. The diagram 600 illustrates the shoaling with a continuous slope ahead of the user device 104 across a horizontal field of view, such as along the horizontal distance 206. The diagram 600 includes the detected seafloor 202.

In an exemplary scenario, the seafloor 202 may be detected up to 80 m. The diagram 600 further includes extrapolated potential shoal 602 ahead of the detected seafloor 202. The horizontal distance 206, such as 100 m, 150 m, 200 m, 250 m, and the like is depicted starting from the user device 104. Moreover, the depth 204 of the potential shoal 602 may be determined. For example, the threshold depth 228 may be 5 m. In such a case, the potential shoal 602 above the threshold depth 228, i.e., between 0 m and 5 m, may be considered as a potential shoal hazard for the user device 104.

Based on the detection of the potential shoal hazard, the hazard calculation module 124 may calculate the horizontal distance between the user device 104 and the potential shoal hazard. The operator 106 of the user device 104 receives warnings or alerts based on the detection of potential shoal hazards in order to provide safe navigation and avoid collision. The extrapolation of the worst-case shoaling as the user device 104 moves ahead in the water body is further explained in FIGS. 7A and 7B.

Figure 7A:
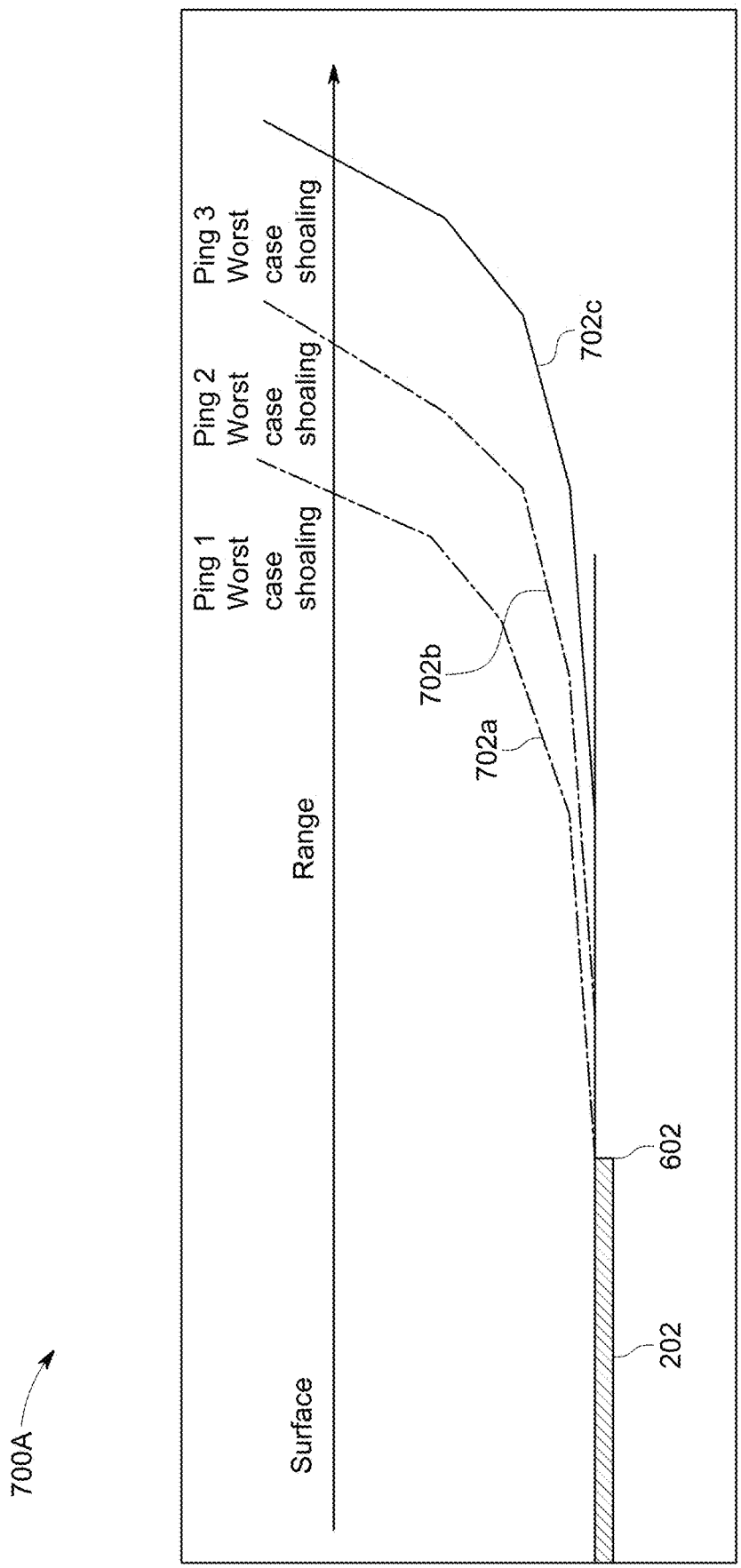
FIG. 7A and FIG. 7B collectively illustrates views of extrapolated shoal lines and shoal hazard lines as the user device moves ahead in the water body, in accordance with an example embodiment.
Figure 7B:
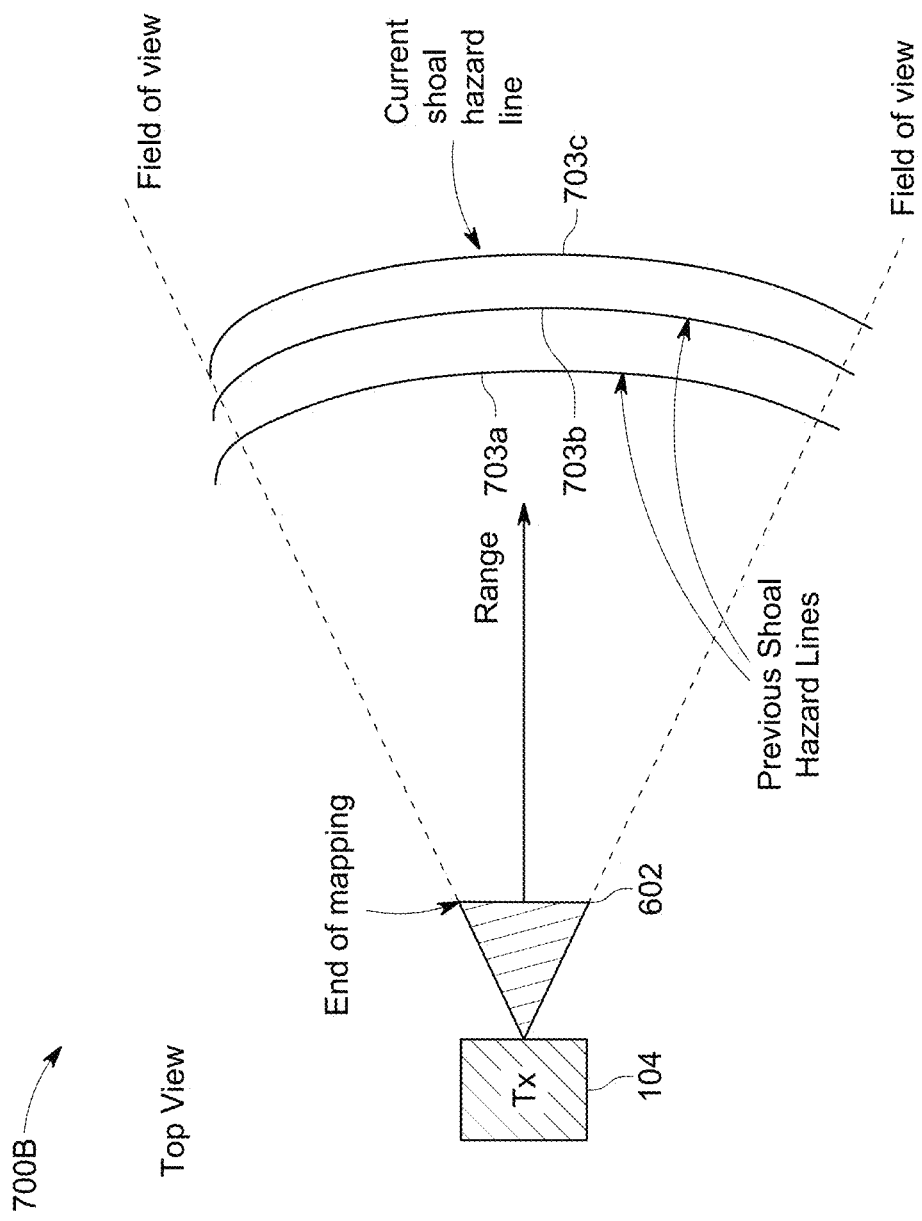

FIGS. 7A and 7B collectively illustrate views of extrapolated shoal lines and shoal hazard lines as the user device 104 moves ahead in the water body, in accordance with an example embodiment.

FIG. 7A illustrates a side view 700A of consecutive shoal lines as the user device 104 moves ahead in the water body. The continuous slope of the extrapolated potential shoal 602 ahead of the detected seafloor 202 as depicted in FIG. 6 is worst-case in a successive transmission cycle of the transmitted beam. The worst-case shoaling data is updated to be the slope translated by some distance as the user device 104 moves ahead in the water body. To use updated worst-case shoaling data on the subsequent passes as the user device 104 travels around the area in the water body, a previous worst-case shoaling data may be overwritten by a deeper worst-case shoaling data and must also be overwritten by bathymetry data from the area in the water body.

The successive transmission cycles are depicted as ping 1, ping 2 and ping 3. Moreover, the successive shoal lines at the successive transmission cycles at ping 1, ping 2 and ping 3 are depicted as a shoal line 702a, a shoal line 702b and a shoal line 702c respectively. For example, at ping 3, the shoal line 702a and the shoal line 702b may be obsolete. The shoal line 702c may be considered as the current shoal line 702c as the user device 104 moves ahead in the water body.

FIG. 7B illustrates a top view 700B of consecutive shoal hazard lines as the user device 104 moves ahead in the water body. A shoal hazard line is a line that shows positions at which depth of the extrapolated shoal lines equals the threshold depth 228. Similar to FIG. 7A, the shoal hazard line 703a and the shoal hazard line 703b may be obsolete as the user device 104 moves ahead in the water body. The shoal hazard line 703c may be considered as the current shoal hazard line 703c as the user device 104 moves ahead in the water body. The shoal hazard line 703a and the shoal hazard line 703b may be overwritten by the shoal hazard line 703c as the user device 104 moves ahead.

Typically, as the worst-case shoaling data is not real and may confuse the operator 106, such layer of information is usually hidden, and instead only the hazards presented by the shoaling computations are presented which further forms an uncertainty ring well beyond the currently detectable seafloor 202. Display of such information extends the range at which safe navigation can be determined, thus allowing for a higher safe navigation speed for the user device 104. If the user device 104 travels in the direction of the uncertainty ring, the ring moves to match new position of the user device 104 as the new worst-case model is usually at a similar range from the user device 104. In the case where the range of worst-case model does not increase at a specific bearing as the user device 104 progresses, an area to be cautious of is immediately identified.

FIG. 8 is a diagram 800 depicting display of an exemplary shoaling data associated with the potential shoal hazard 602 on the display 128 of the sonar device 102, in accordance with an example embodiment. The shoaling data may be drawn as a hazard overlay ahead of the user device 104 with range numbers 802 (i.e., horizontal distance 206) at which the user device 104 may reach the set hazard depth (i.e., the threshold depth 228).

The diagram 800 includes the user device 104 in the water body. The diagram 800 further includes the detected seafloor 202 up to a certain distance towards the horizontal distance 206. As the seafloor 202 is detected at a shorter range on a port side, and it is slightly shallower, the computed shoal hazard is naturally closer on the port side.

In an example, the plurality of transducer elements 114a are arranged in two dimensions. For all vertical planes oriented in different azimuths, the shoal line 218 is extrapolated in each azimuth and the horizontal distance 206 to the potential shoal hazard 602 is calculated for each azimuth. For example, a calculated horizontal distance 802 between the user device 104 and a starting point of the potential shoal hazard 602 is calculated. The diagram 800 depicts the potential shoal hazard 602 calculated for each azimuth at the display 128. If the speed of the user device 104 on which the sonar device 102 is installed is known, the horizontal distance 802 to the potential shoal hazard 602 may be converted into a time of expected collision. Instead of displaying the horizontal distance values, the time of expected collision values may be displayed. The time of expected collision is calculated using the hazard calculation module 124. The time of expected collision of the user device 104 with the potential shoal hazard 602 is calculated based on the calculated horizontal distance 802 and the speed of the user device 104.

It may be noted that extrapolating the shoal line 218 with the fixed angle of incidence 222 regardless of the horizontal distance 206 may not be a problem in shallow water condition, however, it could lead to a less reliable shoal extrapolation in deeper water conditions. In order to cope up with it, a seafloor model that models seafloor detection capability may be used to adjust the angle of incidence 222 used for the extrapolation of the shoal line 218. Exemplary seafloor models are depicted in FIG. 9.

Figure 9:
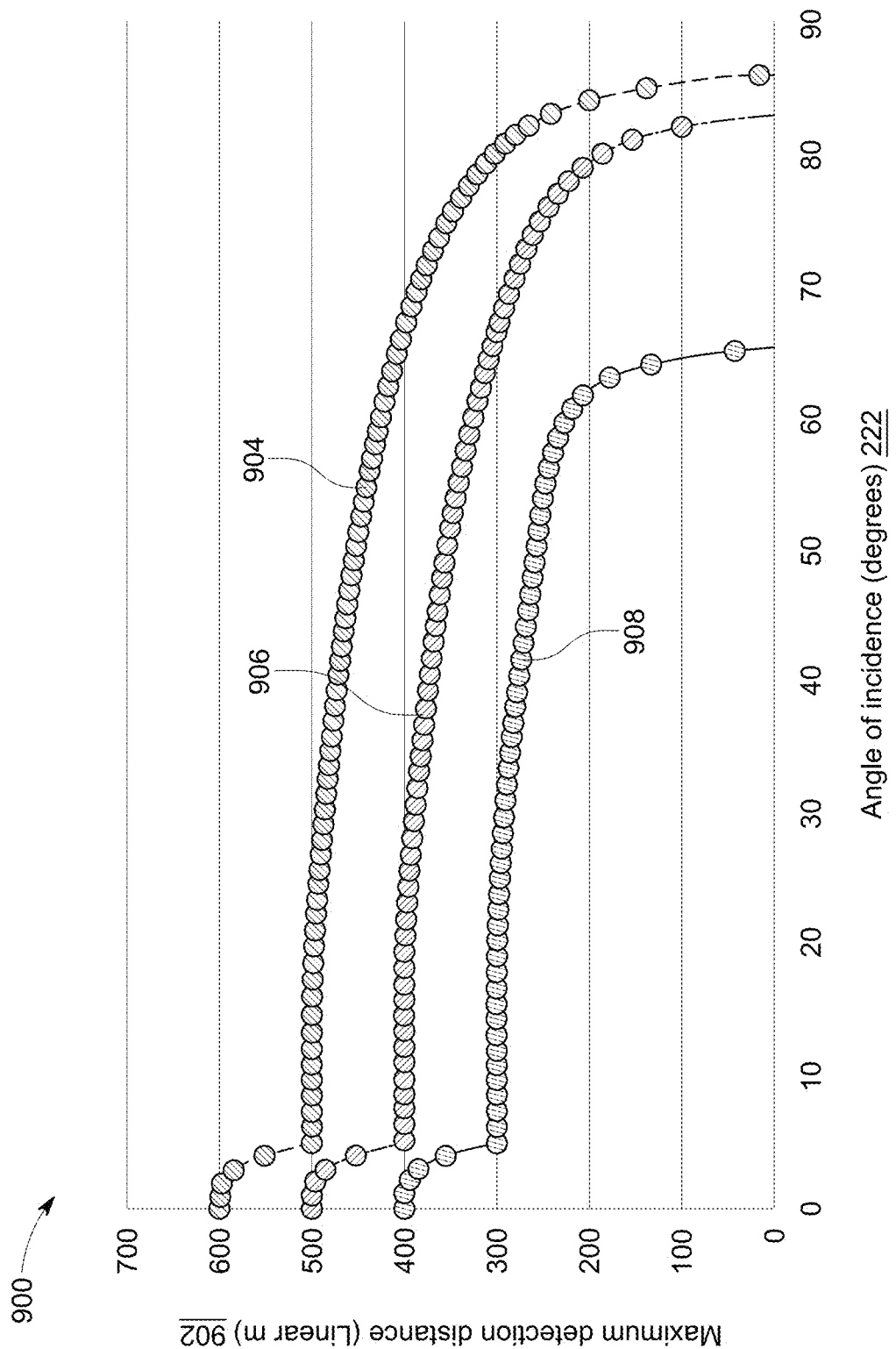
FIG. 9 is a graphical representation that illustrates exemplary seafloor models based on different seafloor types, in accordance with an example embodiment.

FIG. 9 is a graphical representation 900 that illustrates exemplary seafloor models based on different seafloor types, in accordance with an example embodiment. The graphical representation 900 includes an X-axis and a Y-axis. The Y-axis represents a maximum detection distance 902 of the seafloor and the X-axis represents various angles of incidence 222 of ultrasonic wave on the seafloor. The graphical representation 900 depicts a relationship between the maximum detection distance 902 of the seafloor achievable at the various angles of incidence 222 for different seafloor types.

The graphical representation 900 depicts different types of seafloor models based on a type of sediment associated with the seafloor. For example, the type of sediment may be rock, sand or mud. The graphical representation 900 includes a rock based seafloor model 904, a sand based seafloor model 906 and a mud based seafloor model 908.

In some embodiments, the shoal extrapolation module 122 is further configured to acquire or generate the seafloor model based on at least one of seafloor type, seafloor hardness and seafloor reflectivity. In an embodiment, the seafloor model may be generated based on a combination of the seafloor type, the seafloor hardness and the seafloor reflectivity. Typically, the seafloor type, the seafloor hardness and the seafloor reflectivity may be calculated with conventional technologies that analyze echo returns from the seafloor 202 to calculate the seafloor type, the seafloor hardness and the seafloor reflectivity. In another embodiment, the seafloor type, the seafloor hardness and the seafloor reflectivity may also be acquired, for example, from a chart data knowing latitude and longitude position of the sonar device 102.

When considering the seafloor model of how the seafloor 202 may interact with sound beyond the system capability, the seafloor detections closest to the detection limit may be utilized. From the seafloor detections, a tilt angle at which the seafloor 202 detection failed may be determined and a calculated slope of the seafloor 202 in that reception beam direction at the point detection failed may be determined. Based on the tilt angle and the calculated slope, the angle of incidence or the limit incidence angle 216 at which the seafloor 202 detection failed may be computed. The information about the seafloor makeup and roughness from bathymetry, and backscatter intensity data around the loss of detection on that reception beam may be determined. Such information may be utilized to decide the seafloor model is required to apply in this situation with regards to modeling the worst-case shoaling.

Moreover, when modeling the seafloor 202, the seafloor type, the texture, and thus detectable incidence may be assumed, and it continues as it was at the point of detection loss. Further, information from the seafloor type may be used at point of detection loss and the safety factor may be applied, such as subtracting a degree to two to the maximum detectable incidence angle. The maximum detectable incidence with or without the safety factor may be applied. The worst-case reflectivity model based on measurements taken with the sonar device 102 in a wide variety of conditions may be applied. A gradual change with range from the current seafloor type to the worst-case reflectivity model may be allowed. All areas beyond the end of the detection may be treated as the hazard. Furthermore, the detected seafloor characteristics at the point of detection may be used to decide the modeling options. The method of modeling the seafloor 202 may be a complex combination of the above or partially abstracted to the operator 106 depending on their preferences regarding how conservative an approach to modeling the sonar device 102 processing delivers.

It may be noted that most of the seafloor modeling excludes a need to account for the detection limitations of the sonar device 102. No sonar device 102 has infinite detection range 902 and thus there may always be a point at which the detection range 902 limitations of the sonar device 102 should be considered when attempting to model the worst-case situation ahead of the vessel or the user device 104 that may be detected. For example, in the shallow water body, the range limitations may rarely override the seafloor model unless the sonar device 102 operating conditions are poor. However, in the deep water body, it may not be possible to detect the seafloor 202 at an angle exceeding 30 degree angle of incidence, or even at 0 degree angle of incidence.

The detection range 902 depends on the sonar device 102 performance, ambient noise, type of object/seafloor and the angle of incidence 222 in the case of a surface is particularly important. As shown in FIG. 9, the detection range 902 past 600 m is not achievable with the particular seafloor models, thus, the shoal calculations exceeding 600 m detection range 902 would be meaningless. As would any shoal detection range 902 beyond 300 m that required the angle of incidence 222 greater than 80 degrees to be used for the seafloor modeling.

A specific use of the seafloor model by the shoal extrapolation module 122 is explained below. In an embodiment, for each calculated line segment of the series of line segments 224, a distance from the transducer to the line segment and the angle of incidence 222 on the line segment are checked against the seafloor model, such as the rock based seafloor model 904, the sand based seafloor model 906 or the mud based seafloor model 908. If the distance of the line segment at the angle of incidence 222 is more than the maximum detection distance on the seafloor model, then the angle of incidence 222 to use for calculating the line segment should be adjusted to within the detection limit of the sonar device 102. For example, the distance of the line segment is 300 m with an angle of incidence of 70 degrees and the sand based seafloor model 906 is being used. In such a case, by referring to the sand based model 906 of FIG. 9, it is determined that at 300 m, the maximum angle of incidence 222 to detect the sand seafloor is 65 degrees. Thus, the shoaling calculation is adjusted to use a 65-degree angle of incidence 222 rather than 70 degrees for that line segment. Subsequent line segments may have a smaller angle of incidence, and thus, it may continue to degrade rapidly to 5-degree angle of incidence at 400 m in this case.

Moreover, an additional consideration for the shoal modeling application is detectability of smaller objects. A seafloor surface is much larger than that of a small object. So, when small objects become an issue for navigation and the same small objects may not be detected, the shoal model may additionally be modified to account for it. For example, if the shoaling model says there could be a depth of 1.5 m, 100 m ahead and the user device 104 or a boat draws 1 m, in such a case >0.5 m tall rocks may be of consideration. If a 0.5 m rock is undetectable at that range, it would be prudent to account for it with more conservative shoaling model. Thus, understanding the detection range of a small hazard sticking up from the seafloor 202 is of interest when modelling safe passage. Furthermore, if a floating hazard to navigation may no longer be detected at a given range, then it follows that a true indication of 'minimum safe passage' should account for the current expected detection range of such hazards. These and other hazards to safe passage of the user device 104 are detectable using the various embodiments disclosed herein.

Figure 10:
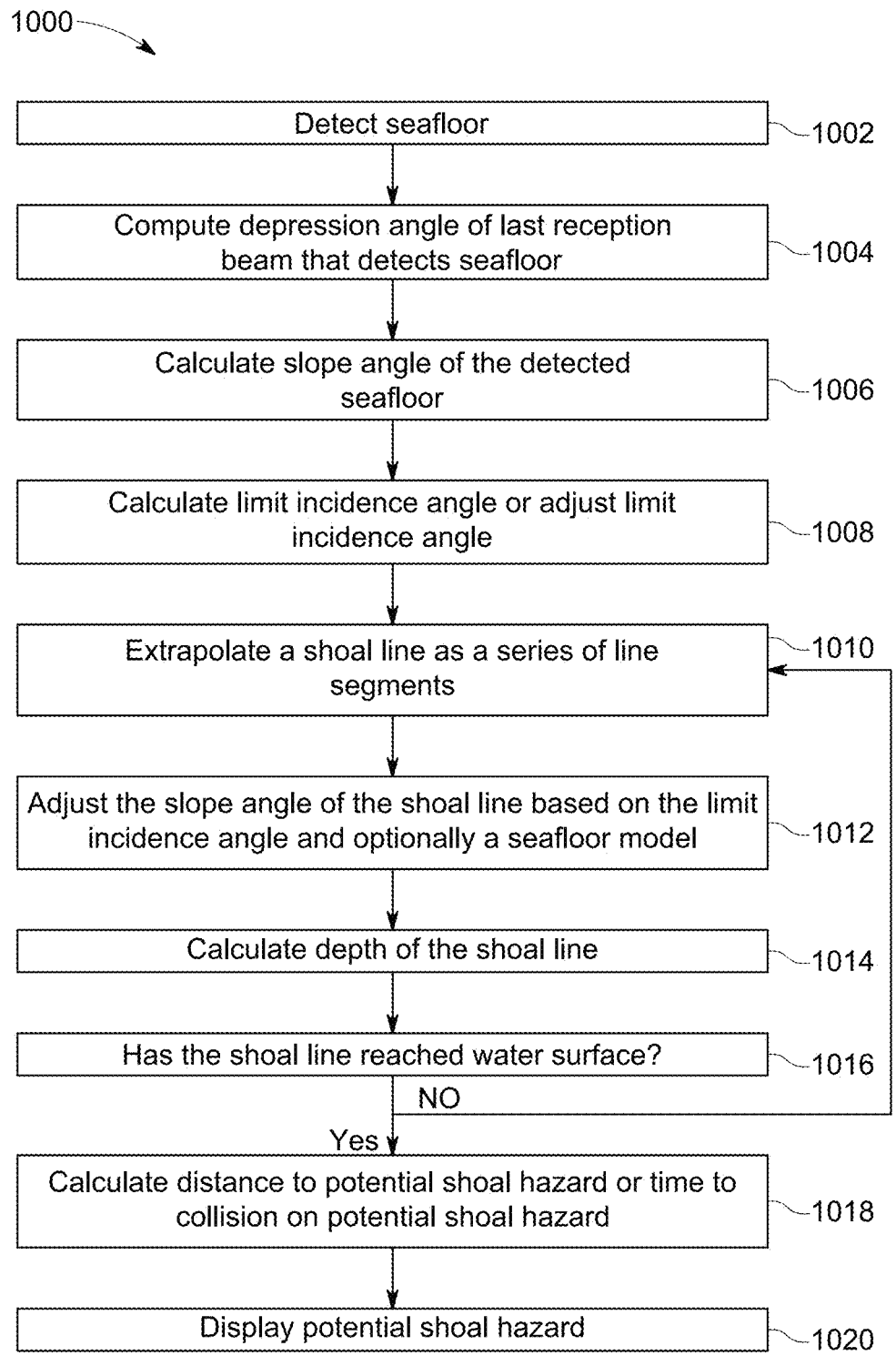
FIG. 10 is a flow diagram of processing shoaling using an iterative process, in accordance with an example embodiment.

FIG. 10 is a flow diagram 1000 of processing shoaling using an iterative process, in accordance with an example embodiment. The flow diagram 1000 is in conjunction with the sonar device 102 of FIGS. 1A and 1B. At step 1002, the sonar device 102 detects the seafloor 202 using the seafloor detection module 118 based on the plurality of reception beams 208 formed by the receiver 116. Further, at step 1004, the sonar device 102 computes the first depression angle 212a of a last reception beam (i.e., the first reception beam 208a) of the plurality of reception beams 208 that could detect the seafloor 202. Based on the computed first depression angle 212a, at step 1006, the sonar device 102 calculates the slope angle 214 of the detected seafloor 202. In an example, the slope angle 214 of the seafloor 202 is calculated by measuring the depth 204 of the seafloor 202 with two different reception beams that could detect the seafloor 202. The two different reception beams correspond to the first reception beam 208a and the third reception beam 208c adjacent to the first reception beam 208a, the third reception beam 208c having a Depression angle bigger than that of the first reception beam 208a. The first reception beam 208a makes the first depression angle ($\alpha$) 212a with the horizontal distance 206. The seafloor 202 has the slope angle ($\beta$) 214 with a horizontal plane.

Further, at step 1008, the limit incidence angle 216 is calculated or adjusted using the slope angle 214 with facilitation of the angle determination module 120. The limit incidence angle 216 corresponds to maximum detection incidence angle that could detect the seafloor 202. The angle determination module 120 calculates the limit incidence angle 216 using a formula: $(90-\alpha-\beta)$ degrees, where $\alpha$ is the first depression angle 212a and $\beta$ is the slope angle 214.

At step 1010, the calculated limit incidence angle 216 is utilized by the shoal extrapolation module 122 that is configured to extrapolate the shoal line 218. The shoal line 218 corresponds to a curved line connecting to the detected seafloor 202. The shoal line 218 is extrapolated as a series of line segments 224. The series of line segments 224 includes the plurality of line segments such as the first line segment 224a and the second line segment 224b. One end of the first line segment 224a connects to the detected seafloor 202 and the other end of the first line segment 224a connects to one end of the second line segment 224b, and so forth. Further, these connections of the series of line segments 224 facilitate to adjust the slope angles 226 of the line segments based on the calculated limit incidence angle 216.

At step 1012, the slope angle 226 is adjusted based on the calculated or the set limit incidence angle 216. The slope angle 226 of each line segment is adjusted such that the reception beam incident to said line segment makes the angle of incidence 222 equal to the calculated or set limit incidence angle 216. Optionally, the slope angle 226 may also be adjusted based on the seafloor model.

At step 1014, the depth 204 of the extrapolated shoal line 218 is calculated. The depth 204 includes the first depth D1, the second depth D2, the third depth D3, the fourth depth D4, and the fifth depth D5.

The calculated depth of the extrapolated shoal line 218 is utilized by the hazard calculation module 124 to determine the potential shoal hazard. The line segment of the extrapolated shoal line 218 whose depth is less than the given threshold depth 228, is considered as the potential shoal hazard. The portion of the extrapolated shoal line 218 that is above the threshold depth 228 represents the potential shoal hazard.

At step 1016, the sonar device 102 checks whether the shoal line 218 reached water surface or not. If the shoal line 218 has not reached the water surface (NO), step 1010 is followed again with the subsequent line segment of the shoal line 218. If the shoal line 218 has reached the water surface (YES), step 1018 is followed. At step 1018, the hazard calculation module 124 of the sonar device 102 calculates distance to the potential shoal hazard or time to collision with the potential shoal hazard. At step 1020, the potential shoal hazard is displayed using the display 128 of the sonar device 102. The hazard calculation module 124 is configured to convert the calculated horizontal distance 206 into the time of expected collision based on the speed of the user device 104 on which the sonar device 102 is installed and display the time of expected collision to the operator 106. In addition, the sonar device 102 sends warnings or alerts to the operator 106 based on the detected potential shoal hazards.

Figure 11:
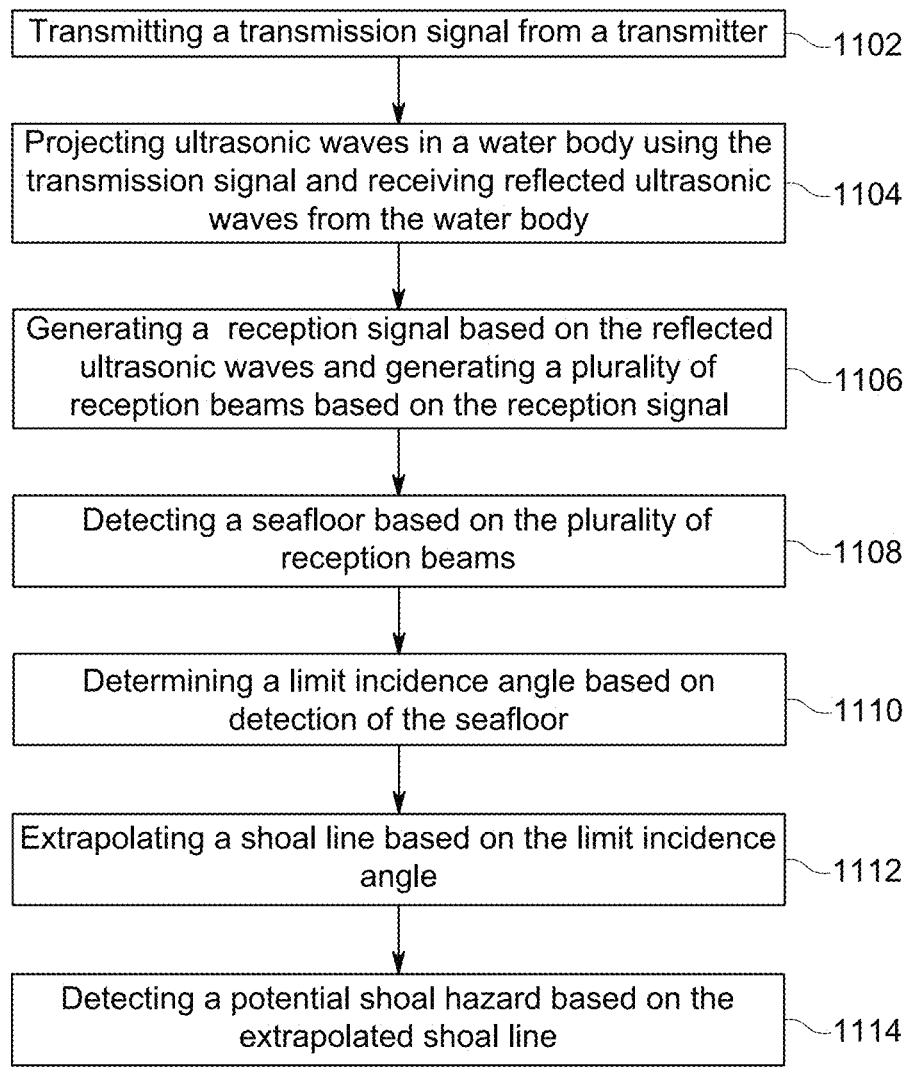
FIG. 11 is a flow diagram depicting a shoal detection method, in accordance with an example embodiment.

FIG. 11 is a flow chart 1100 depicting a shoal detection method, in accordance with an example embodiment. At step 1102, the method 1100 includes transmitting a transmission signal from the transmitter 112. The transmitter 112 transmits the transmission signal to the transducer 114. The transducer 114 includes a plurality of transducer elements 114a. The transmitter 112 transmits the transmission signal to each of the plurality of transducer elements 114a. The plurality of transducer elements 114a corresponds to ultrasonic transducer elements such as an array of piezoelectric crystals. The transducer 114 transforms the transmission signal to the ultrasonic waves 108.

At step 1104, method 1100 includes projecting the ultrasonic waves 108 in the water body using the transmission signal and receiving the reflected ultrasonic waves 108 from the water body with facilitation of the transducer 114. Each of the plurality of transducer elements 114a of the transducer 114 is configured to receive the reflected waves (the received ultrasonic waves 108) that are reflections of the ultrasonic waves 108 on the seafloor 202 and the one or more objects in the water body.

At step 1106, the method 1100 includes generating the reception signal based on the reflected ultrasonic waves 108 with facilitation of the transducer 114 and generating the plurality of reception beams 208 based on the reception signal using the receiver 116. The receiver 116 is configured to receive the reception signal of each of the plurality of transducer elements 114a. The receiver 116 performs beamforming from the reception signal of each of the plurality of transducer elements 114a to form the plurality of reception beams 208 in a plurality of directions. In general, the reception beams are utilized to detect the seafloor 202 and the other underwater objects in multiple directions.

At step 1108, the method 1100 includes detecting the seafloor 202 based on the plurality of reception beams 208 using the seafloor detection module 118. The seafloor detection module 118 is configured to calculate the first depression angle 212a for the first reception beam 208a of the plurality of reception beams 208.

Further, at step 1110, the method 1100 includes determining the limit incidence angle 216 using the angle determination module 120. To that end, the limit incidence angle 216 is the maximum incidence angle at which the seafloor 202 is detectable, as has been described previously. The angle determination module 120 is configured to calculate the limit incidence angle 216 based at least on one of the first depression angle 212a and the second depression angle 212b. In an embodiment, the angle determination module 120 is configured to determine the limit incidence angle 216 based on the detection of the seafloor 202 on the first reception beam 208a of the plurality of reception beams 208 with the first depression angle 212a in the vicinity of the second depression angle 212b of the second reception beam 208b of the plurality of reception beams 208 on which the seafloor 202 is undetected. The second depression angle 212b is smaller than the first depression angle 212a. The angle determination module 120 is further configured to determine the limit incidence angle 216 based on the slope angle 214 of the seafloor calculated by the seafloor detection module 118. In addition, the angle determination module 120 is configured to determine the limit incidence angle 216 based on the preset value of the limit incidence angle 216 or adjustment of the preset value of the limit incidence angle 216 through the user interface 130 of the sonar device 102.

At step 1112, the method 1100 includes extrapolating the shoal line 218 that connects to the detected seafloor 202 based on the limit incidence angle 216. The shoal extrapolation module 122 is configured to extrapolate the shoal line 218. The shoal line 218 corresponds to a curved line connecting the detected seafloor 202. The shoal line 218 is extrapolated as the series of line segments 224 as explained earlier in FIG. 2E.

At step 1114, the method 1100 includes detecting the potential shoal hazard 602 based on the extrapolated shoal line 218 with facilitation of the hazard calculation module 124. The hazard calculation module 124 is configured to calculate the horizontal distance 206 from the transducer 114 to the potential shoal hazard 602 when the depth of the extrapolated shoal line 218 is less than the threshold depth 228. Further, the detected seafloor 202 and the potential shoal hazard at the calculated horizontal distance 206 are displayed to the operator 106 using the display 128. The hazard calculation module 124 is configured to convert the calculated horizontal distance 206 into the time of expected collision based on the speed of the user device 104 on which the sonar device 102 is installed and display the calculated horizontal distance or the time of expected collision to the operator 106 on the display 128. In addition, the sonar device 102 sends warnings or alerts to the operator 106 based on the detected potential hazards.

The method 1100 thus disclosed above may be executed by a processor, which may be configured to execute computer-executable instructions corresponding to steps of the method 1100 described above. The sonar device 102 may include a memory storing the computer-executable instructions.

Figure 12:
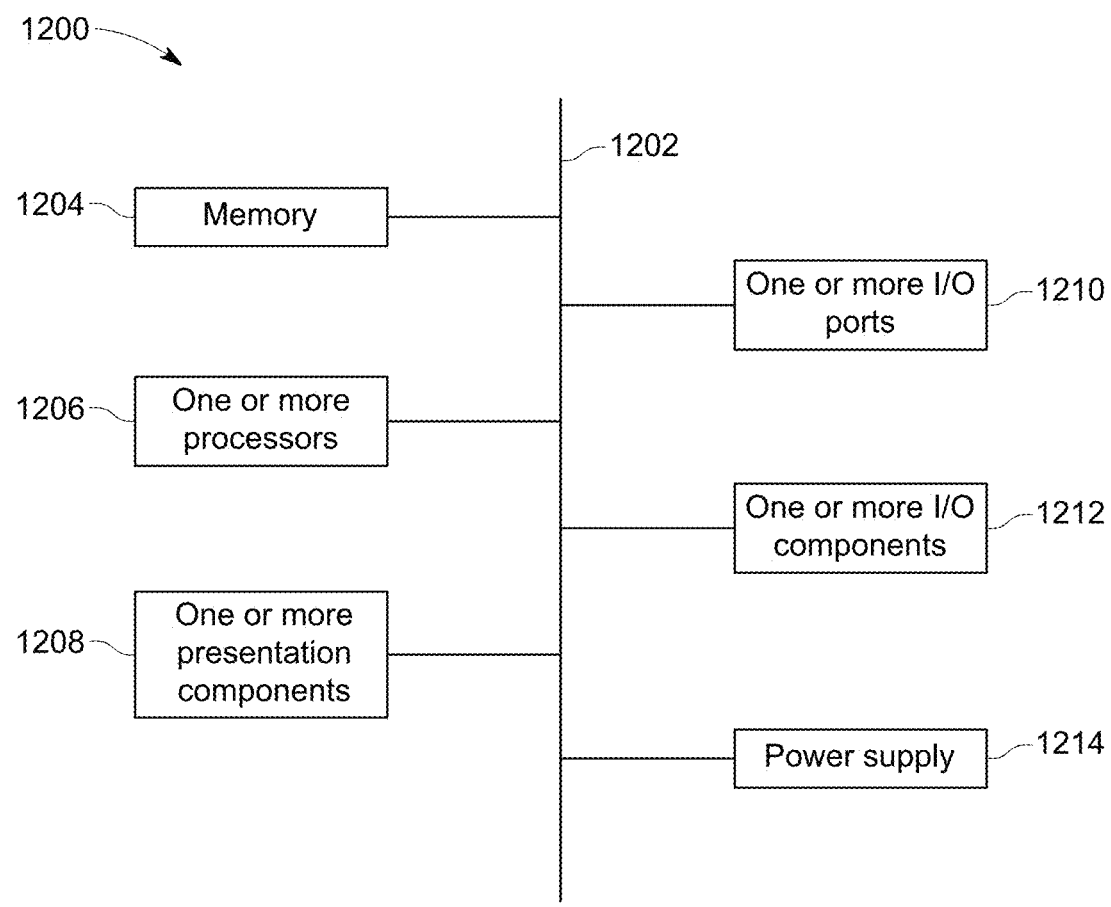
FIG. 12 is a block diagram illustrating internal components of the sonar device of FIG. 1A, in accordance with an example embodiment.

FIG. 12 is a block diagram 1200 illustrating internal components of the sonar device 102 of FIG. 1A. The internal components include a bus 1202 that directly or indirectly couples the following devices: memory 1204, one or more processors 1206, one or more presentation components 1208, one or more input/output (I/O) ports 1210, one or more input/output components 1212, and an illustrative power supply 1214. The bus 1202 represents what may be one or more busses (such as an address bus, data bus, or combination thereof). Although the various blocks of FIG. 12 are shown with lines for the sake of clarity, in reality, delineating various components is not so clear, and metaphorically, the lines would more accurately be grey and fuzzy. For example, one may consider a presentation component such as a display device to be an I/O component. It may be understood that the diagram of FIG. 12 is merely illustrative of an exemplary sonar device 102 that can be used in connection with one or more embodiments of the present invention. The distinction is not made between such categories as "workstation," "server," "laptop," "hand-held device," etc., as all are contemplated within the scope of FIG. 12 and reference to "a sonar device 102 of FIGS. 1A and 1B" and at equivalent places within the description outlined herein.

The sonar device 102 typically includes a variety of computer-readable media. The computer-readable media can be any available media that can be accessed by the sonar device 102 and includes both volatile and nonvolatile media, removable and non-removable media. By way of example, and not limitation, the computer-readable media may comprise computer readable storage media and communication media. The computer readable storage media includes volatile and nonvolatile, removable and non-removable media implemented in any method or technology for storage of information such as computer-readable instructions, data structures, program modules or other data.

The computer-readable storage media with the memory 1204 includes, but is not limited to, non-transitory computer readable media that stores program code and/or data for longer periods of time such as secondary or persistent long term storage, like RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the communication device. The computer-readable storage media associated with the memory 1204 and/or other computer-readable media described herein can be considered computer readable storage media for example, or a tangible storage device. The communication media typically embodies computer-readable instructions, data structures, program modules or other data in a modulated data signal such as a carrier wave or other transport mechanism and in such includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media. The sonar device 102 includes one or more processors that read data from various entities such as the memory 1204 or I/O components 1212. The one or more presentation components 1208 present data indications to a user or other device. Exemplary presentation components include a display device, speaker, printing component, vibrating component, etc. The one or more I/O ports 1210 allow the sonar device 102 to be logically coupled to other devices including the one or more I/O components 1212, some of which may be built in. Illustrative components include a microphone, speaker, joystick, satellite dish, scanner, printer, wireless device, etc.

The above-described embodiments of the present disclosure may be implemented in any of numerous ways. For example, the embodiments may be implemented using hardware, software or a combination thereof. When implemented in software, the software code may be executed on any suitable processor (processing circuitry) or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Therefore, it is the object of the appended claims to cover all such variations and modifications as come within the true spirit and scope of the present disclosure.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated" and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A sonar device configured to be installed in a vessel, the sonar device comprising:
    a transmitter configured to transmit a transmission signal;
    a transducer configured to:
        project ultrasonic waves in a water body, wherein the ultrasonic waves are generated based on the transmission signal, receive reflected ultrasonic waves from one or more objects in the water body, and generate a reception signal based on the reflected ultrasonic waves; and processing circuitry configured to:

generate a plurality of reception beams based on the reception signal, detect a seafloor among the one or more objects based on the plurality of reception beams, determine a limit incidence angle at which the seafloor is detected, generate a predicted location of a shoal line that may exist between a position of the seafloor that was detected via a most horizontal reception beam of the plurality of reception beams and a surface of the body of water, wherein the predicted location of the shoal line is generated by extrapolating the detected seafloor beyond the position of the seafloor that was detected via the most horizontal reception beam to the surface of the body of water based on the limit incidence angle, wherein the predicted location of the shoal line connects with the detected seafloor, and detect a potential shoal hazard based on a determined depth of the predicted location of the shoal line.

2. The sonar device of claim 1, wherein the plurality of reception beams comprises at least a first reception beam on which the seafloor is detectable, and a second reception beam on which the seafloor is non-detectable; and wherein the first reception beam is in vicinity of the second reception beam.

3. The sonar device of claim 2, wherein the processing circuitry is further configured to determine the limit incidence angle based on calculation of at least one of:

a first depression angle of the first reception beam or a second depression angle of the second reception beam, wherein the second depression angle is smaller than the first depression angle.

4. The sonar device of claim 3, wherein the processing circuitry is further configured to:

determine a third depression angle of a third reception beam of the plurality of reception beams at which the seafloor is detectable, calculate a slope angle of the detected seafloor based on the determined third depression angle and the first depression angle of the first reception beam, and determine the limit incidence angle based on the calculated slope angle.

5. The sonar device of claim 1, wherein the processing circuitry is further configured to determine the limit incidence angle based on a preset value of the limit incidence angle or an adjustment of the preset value of the limit incidence angle through a user interface of the sonar device.

6. The sonar device of claim 5, wherein the preset value of the limit incidence angle is between 50 and 85 degrees.

7. The sonar device of claim 1, wherein the processing circuitry is further configured to generate the predicted location of the shoal line based on at least one reception beam of the plurality of reception beams intersecting a normal to a tangent of the shoal line at a point on the shoal line, said reception beam and said normal making an angle of incidence that is set based on the limit incidence angle.

8. The sonar device of claim 1, wherein the processing circuitry is further configured to generate the predicted location of the shoal line as a series of line segments, wherein a first line segment of the series of line segments is placed between the detected seafloor and a second line segment of the series of line segments, and wherein a first slope angle of the first line segment with the horizontal direction is smaller than a second slope angle of the second line segment with the horizontal direction.

9. The sonar device of claim 7, wherein the processing circuitry is further configured to set the angle of incidence based on a sum of the limit incidence angle and a predetermined safety factor, wherein the predetermined safety factor is a positive value, a negative value, or zero.

10. The sonar device of claim 1, wherein the processing circuitry is further configured to:

acquire a seafloor model generated based on at least one of a seafloor type, a seafloor hardness or a seafloor reflectivity, wherein the seafloor model determines a maximum seafloor detection distance as a function of angle of incidence of ultrasonic waves on the seafloor model, and generate the predicted location of the shoal line based on the seafloor model.

11. The sonar device of claim 1, wherein the processing circuitry is configured to:

determine the depth associated with the predicted location of the shoal line, wherein the depth associated with the predicted location of the shoal line is a distance between a point on the shoal line and the surface of the water body, detect the potential shoal hazard based on a determination that the determined depth associated with the predicted location of theshoal line is less than a threshold depth, and calculate a horizontal distance from the transducer to the detected potential shoal hazard.

12. The sonar device of claim 11, further comprising a display configured to display the detected potential shoal hazard at the calculated horizontal distance and the detected seafloor.

13. The sonar device of claim 12, wherein the display is configured to further display the calculated horizontal distance or display a time of expected collision of the vessel with the potential shoal hazard, wherein the time of expected collision is calculated based on the calculated horizontal distance and a speed of the vessel.

14. A shoal detection method, comprising:

transmitting a transmission signal from a transmitter to a transducer;

projecting ultrasonic waves in a water body based on the transmission signal and receiving reflected ultrasonic waves from one or more objects in the water body;

generating a reception signal based on the reflected ultrasonic waves;

generating a plurality of reception beams based on the reception signal;

detecting a seafloor among the one or more objects based on the plurality of reception beams;

determining a limit incidence angle at which the seafloor is detected;

generating a predicted location of a shoal line that may exist between a position of the seafloor that was detected via a most horizontal reception beam of the plurality of reception beams and a surface of the body of water, wherein the predicted location of the shoal line is generated by extrapolating the detected seafloor beyond the position of the seafloor that was detected via the most horizontal reception beam to the surface of the body of water based on the limit incidence angle, wherein the predicted location of the shoal line connects with the detected seafloor; and detecting a potential shoal hazard based on a determined depth of the predicted location of the shoal line.

15. A non-transitory computer-readable medium having stored thereon computer-executable instructions which, when executed by a computer, cause the computer to:

transmit a transmission signal from a transmitter to a transducer;

project ultrasonic waves in a water body based on the transmission signal and receive reflected ultrasonic waves from one or more objects in the water body;

generate a reception signal based on the reflected ultrasonic waves;

generate a plurality of reception beams based on the reception signal;

detect a seafloor among the one or more objects based on the plurality of reception beams;

determine a limit incidence angle at which the seafloor is detected;

generate a predicted location of a shoal line that may exist between a position of the seafloor that was detected via a most horizontal reception beam of the plurality of reception beams and a surface of the body of water, wherein the predicted location of the shoal line is generated by extrapolating the detected seafloor beyond the position of the seafloor that was detected via the most horizontal reception beam to the surface of the body of water based on the limit incidence angle, wherein the predicted location of the shoal line connects with the detected seafloor; and detect a potential shoal hazard based on a determined depth of the predicted location of the shoal line.

16. The sonar device of claim 1, wherein the limit incidence angle is determined based on a slope angle of the detected seafloor in a vicinity of the position of the seafloor that was detected via the most horizontal reception beam.

17. The sonar device of claim 1, wherein the processing circuitry is configured to update the predicted location of the shoal line based on movement of the vessel.

18. The sonar device of claim 1, wherein the limit incidence angle corresponds to an angle between a most shallow reception beam of the plurality of reception beams at which the seafloor is detectable and a normal to a tangent of the surface of the seafloor.

* * * * *